(12) United States Patent
Kim et al.

(10) Patent No.: US 12,445,900 B2
(45) Date of Patent: Oct. 14, 2025

(54) ELECTRONIC DEVICE AND METHOD FOR PERFORMING COMMUNICATION USING SAME

(71) Applicant: SAMSUNG ELECTRONICS CO., LTD., Suwon-si (KR)

(72) Inventors: Hyunchul Kim, Suwon-si (KR); Moonseok Kang, Suwon-si (KR); Yi Yang, Suwon-si (KR); Jonghoon Jang, Suwon-si (KR); Kunyoung Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 419 days.

(21) Appl. No.: 18/099,474

(22) Filed: Jan. 20, 2023

(65) Prior Publication Data

US 2023/0164622 A1    May 25, 2023

Related U.S. Application Data

(63) Continuation of application No. PCT/KR2021/009725, filed on Jul. 27, 2021.

(30) Foreign Application Priority Data

Aug. 4, 2020  (KR) .......... 10-2020-0097653

(51) Int. Cl.
*H04W 28/02* (2009.01)
*G01S 13/08* (2006.01)
*H04W 28/08* (2023.01)

(52) U.S. Cl.
CPC ......... *H04W 28/0284* (2013.01); *G01S 13/08* (2013.01); *H04W 28/0289* (2013.01); *H04W 28/08* (2013.01)

(58) Field of Classification Search
CPC ............ H04W 28/08; H04W 28/0284; H04W 28/0289; G01S 13/08
See application file for complete search history.

(56) References Cited

U.S. PATENT DOCUMENTS

| 7,372,867 B2 | 5/2008 | Ginzburg et al. |
| 8,477,016 B2 | 7/2013 | Seo et al. |

(Continued)

FOREIGN PATENT DOCUMENTS

| EP | 1 642 420 | 7/2014 |
| EP | 3651410 | 5/2020 |

(Continued)

OTHER PUBLICATIONS

Indian Office Action issued Sep. 2, 2024 in corresponding Indian Patent Application No. 202337004428.

(Continued)

*Primary Examiner* — Jeong S Park
(74) *Attorney, Agent, or Firm* — Nixon & Vanderhye, P.C.

(57) ABSTRACT

An electronic device, according to various embodiments of the present disclosure, comprises: a communication module and a processor operatively connected to the communication module, wherein the processor may be configured to: broadcast, through the communication module, a first message for measuring a distance in each of a plurality of distance measurement subsections included in a first distance measurement section; receive, via the communication module, in each of the plurality of distance measurement subsections, at least one second message in response to the first message from at least one external electronic device; determine information related to congestion of each of the plurality of distance measurement subsections, based on the number of the at least one second message received in each of the plurality of distance measurement subsections; and broad- (Continued)

cast, through the communication module, a third message including the information related to the congestion in a first distance measurement subsection of a plurality of distance measurement subsections included in a second distance measurement section.

20 Claims, 19 Drawing Sheets

(56) References Cited

U.S. PATENT DOCUMENTS

| | | | |
|---|---|---|---|
| 10,039,073 B2 | 7/2018 | Kakani et al. | |
| 10,536,805 B2 | 1/2020 | Nallampatti Ekambaram et al. | |
| 10,652,925 B2 | 5/2020 | Naguib et al. | |
| 11,381,277 B2 | 7/2022 | Jang et al. | |
| 11,493,621 B2 | 11/2022 | Naguib et al. | |
| 2009/0262010 A1 | 10/2009 | Kwak et al. | |
| 2010/0240377 A1 | 9/2010 | De Pasquale et al. | |
| 2012/0172060 A1* | 7/2012 | Qing | H04M 1/72412 455/456.6 |
| 2013/0044657 A1 | 2/2013 | Oh et al. | |
| 2015/0113450 A1* | 4/2015 | Feng | G06F 3/04845 715/763 |
| 2017/0086086 A1* | 3/2017 | Bhatia | H04W 72/30 |
| 2017/0099587 A1* | 4/2017 | Patel | H04W 28/0284 |
| 2019/0221110 A1* | 7/2019 | Vanderveen | G01S 5/0072 |
| 2020/0077292 A1* | 3/2020 | Tsuyunashi | H04W 4/44 |
| 2020/0137676 A1* | 4/2020 | Yoon | H04W 64/006 |
| 2020/0150261 A1 | 5/2020 | Naguib et al. | |
| 2020/0200862 A1 | 6/2020 | Li et al. | |
| 2020/0213842 A1 | 7/2020 | Li et al. | |
| 2020/0296614 A1* | 9/2020 | Lee | H04W 64/006 |
| 2022/0007333 A1 | 1/2022 | Lee et al. | |
| 2022/0417898 A1 | 12/2022 | Kim et al. | |

FOREIGN PATENT DOCUMENTS

| | | |
|---|---|---|
| KR | 10-0625675 | 9/2006 |
| KR | 10-2007-0047628 | 5/2007 |
| KR | 10-0939276 | 1/2010 |
| KR | 10-2020-0028671 | 3/2020 |
| KR | 10-2020-0035205 | 4/2020 |
| KR | 10-2020-0054114 | 5/2020 |
| KR | 10-2020-0070054 | 6/2020 |
| KR | 10-2021-0116119 | 9/2021 |

OTHER PUBLICATIONS

International Search Report dated Oct. 22, 2021 in PCT/KR2021/009725, 2 pages.

Verso, Billy (Decawave), 'Ranging procedures and messages', IEEE P802.15-18-xxxx-00-004z, Sep. 10, 2018.

Li, Zheda (Samsung) et al. 'IEEE 802.15.4z HRP comment resolutions', IEEE P802. 15-19-0253-00-004z, Section 6.9.8.1., Jun. 17, 2019.

Shin, "Clarification on priority access operation over IEEE 802.16.1a", Jul. 9, 2012, 4 pages.

Extended European Search Report dated Dec. 6, 2023 issued in European Patent Application No. 21852510.3.

Korean Office Action issued Jul. 18, 2025 in corresponding Korean Patent Application No. 10-2020-0097653.

* cited by examiner

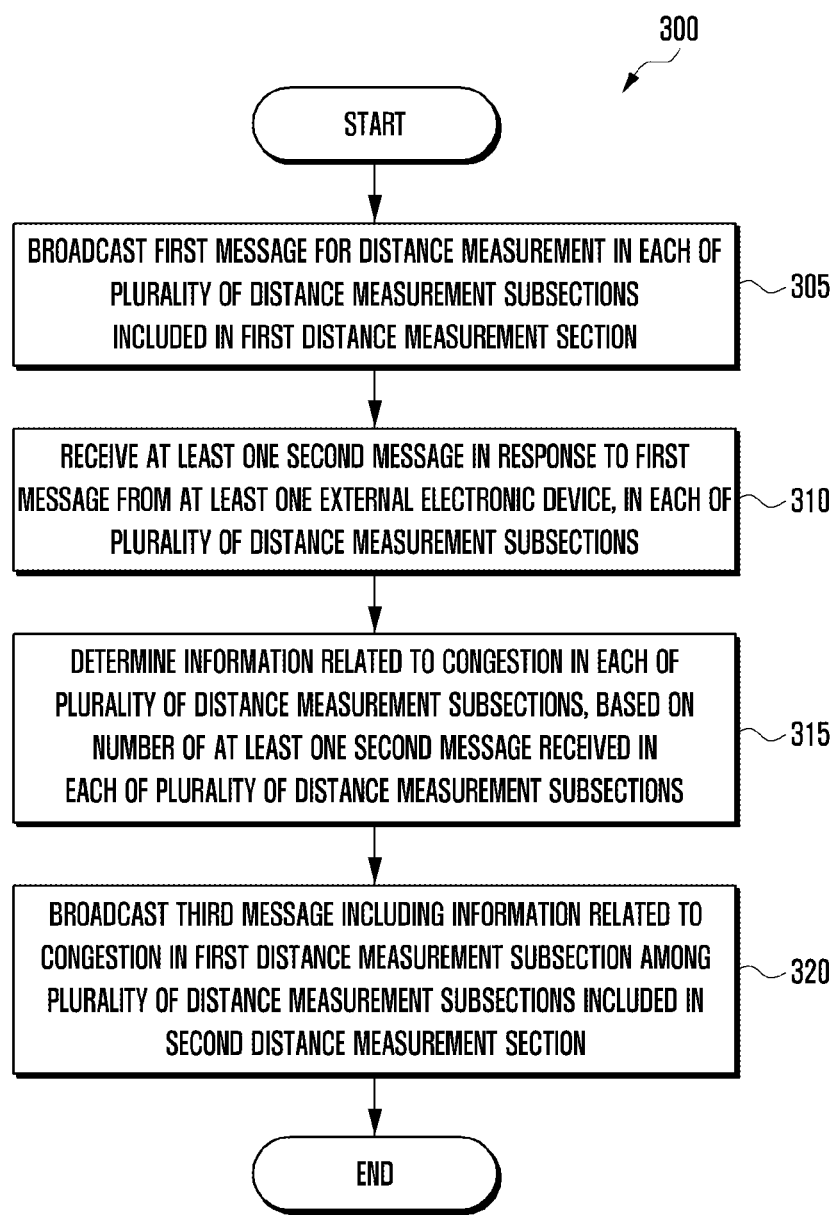

FIG. 8

| CP utilization rate (810) | Degree of congestion (820) |
|---|---|
| 0% ~ 10% | Quiet |
| 11% ~ 25% | Normal |
| 26% ~ 100% | Busy |

| CP utilization rate (910) | Degree of congestion (920) | |
|---|---|---|
| 0% ~ 10% | Quiet | ~930 |
| 11% ~ 25% | Normal | ~940 |
| 26% ~ 40% | Busy | ~950 |
| 41% ~ 100% | Overcrowded | ~960 |

| RR Index [1010] | Congestion [1015] | Available RR Index Mask [1020] | |
|---|---|---|---|
| 0 | Quiet | 1 | ~1030 |
| 1 | Normal | 0 | ~1035 |
| 2 | Busy | 0 | ~1040 |
| 3 | Normal | 0 | ~1045 |
| 4 | Busy | 0 | ~1050 |
| 5 | Busy | 1 (Current RR) | ~1055 |
| 6 | Quiet | 1 | ~1060 |

| RR Index (1110) | Congestion (1115) | Available RR Index Mask (1120) | |
|---|---|---|---|
| 0 | Quiet | 1 | ~1130 |
| 1 | Quiet | 1 | ~1140 |
| 2 | Normal | 0 | ~1150 |
| 3 | Quiet | 1 | ~1160 |
| 4 | Quiet | 1 | ~1170 |
| 5 | Busy | 1 (Current RR) | ~1180 |

ELECTRONIC DEVICE AND METHOD FOR PERFORMING COMMUNICATION USING SAME

CROSS-REFERENCE TO RELATED APPLICATIONS

This application is a continuation of International Application No. PCT/KR2021/009725 designating the United States, filed on Jul. 27, 2021, in the Korean Intellectual Property Receiving Office and claiming priority to Korean Patent Application No. 10-2020-0097653, filed on Aug. 4, 2020, in the Korean Intellectual Property Office, the disclosures of which are incorporated by reference herein in their entireties.

BACKGROUND

Field

The disclosure relates to an electronic device and a method for performing communication using the same.

Description of Related Art

With the development of wireless communication technology, electronic devices are commonly used in daily life, and a user's demand level is increasing. Various types of wireless communication technologies may be used to meet user requirements. For example, the wireless communication technology may include one or more of ultra-wideband (UWB) communication, wireless fidelity (Wi-Fi) communication, long-term evolution (LTE) communication, 5G communication (or new radio (NR) communication), and Bluetooth communication. In particular, the electronic device may measure the position (or distance, angle) of at least one external electronic device using ultra-wideband (UWB) communication. For example, the electronic device may broadcast a message for measuring a distance, and may receive a response message from at least one external electronic device that has received the message. The electronic device may measure the location (or distance, angle) of at least one external electronic device based on the message for measuring the distance and the response message.

When an electronic device receives response messages from more than a specified number of external electronic devices in response to the distance measurement message in the distance measurement section, a collision between the external electronic devices may occur in a specific section. Accordingly, it may be difficult for the electronic device to measure a distance from external electronic devices.

SUMMARY

Embodiments of the disclosure provide an electronic device that may identify the number of response messages received from at least one external electronic device in the distance measurement section, and identify information related to congestion in the distance measurement section, based thereon.

Embodiments of the disclosure provide an electronic device that may broadcast information related to congestion in a message for measuring a distance. At least one external electronic device that has received the message including the information related to congestion may maintain or change a distance measurement section in which to transmit a response message, based on the information related to congestion.

An electronic device according to various example embodiments of the present disclosure may include: a communication module, and a processor operatively coupled to the communication module, wherein the processor is configured to: broadcast, through the communication module, a first message for measuring a distance in each of a plurality of distance measurement subsections included in a first distance measurement section, receive, via the communication module, in each of the distance measurement subsections, at least one second message in response to the first message from at least one external electronic device, determine information related to congestion of each of the plurality of distance measurement subsections based on the number of the at least one second message received in each of the plurality of distance measurement subsections, and broadcast, through the communication module, a third message including the information related to the congestion in a first distance measurement subsection of a plurality of distance measurement subsections included in a second distance measurement section.

A method of performing communication of an electronic device according to various example embodiments of the present disclosure may include: broadcasting a first message for requesting a location in each of a plurality of distance measurement subsections included in a first distance measurement section through a communication module, receiving at least one second message in response to the first message from at least one external electronic device in each of the distance measurement subsections of the plurality of distance measurement subsections, determining information related to congestion of each of the plurality distance measurement subsections based on the number of the at least one second message received in the distance measurement subsection of each of the plurality of distance measurement subsections, and broadcasting a third message including information related to congestion in a first distance measuring subsection among a plurality of distance measuring subsections included in the second distance measuring section through the communication module.

An electronic device according to various example embodiments of the present disclosure may include: a communication module, and a processor operatively coupled to the communication module, wherein the processor is configured to: receive, via the communication module, a first message for distance measurement from an external electronic device in a first distance measurement subsection of a first distance measurement section, transmit, via the communication module, a second message to the external electronic device in response to the first message, receive a third message including information related to congestion from the external electronic device in a first distance measurement subsection of a second distance measurement section via the communication module, transmit, via the communication module, a fourth message to the external electronic device in response to the third message, and determine a distance measurement subsection in which a fifth message is to be transmitted in the third distance measurement section, based on the information related to congestion.

The electronic device according to various example embodiments of the present disclosure may broadcast information related to congestion in a message for measuring a distance. At least one external electronic device that has received the message including the information related to congestion may maintain or change a distance measurement section in which to transmit a response message, based on the information related to congestion. Accordingly, collisions between external electronic devices that may occur in the distance measurement section may be prevented and/or reduced. In addition, since the at least one external electronic device may transmit a response message in a distance measurement section with a low degree of congestion, based on information related to congestion, current consumption may also be reduced compared to transmitting a response message in a distance measurement section with a high degree of congestion.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 3A is a flowchart illustrating an example method of operating an electronic device for broadcasting a message for measuring a distance, according to various embodiments;

FIG. 8 is a diagram illustrating an example of identifying information related to congestion in each of a plurality of distance measurement subsections included in a distance measurement section, according to various embodiments;

FIG. 9 is a diagram illustrating an example of identifying information related to congestion in each of a plurality of distance measurement subsections included in a distance measurement section, according to various embodiments;

FIG. 10 is a diagram illustrating example information related to congestion in a contention phase (CP) period and a usable ranging round index mask, according to various embodiments;

FIG. 11 is a diagram illustrating example information related to congestion in a CP period and a ranging round index mask available according to various embodiments;

DETAILED DESCRIPTION

Figure 1:
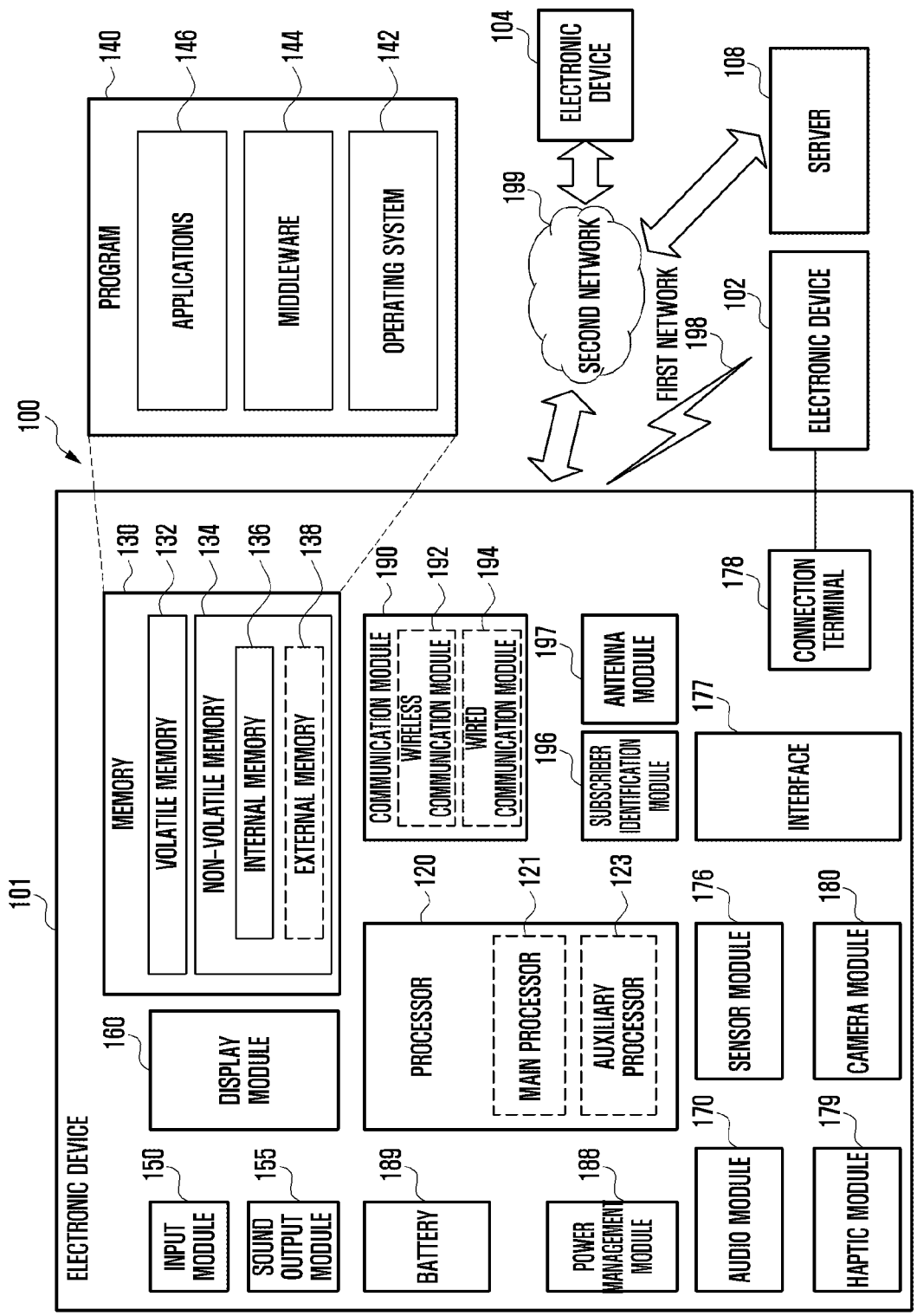
FIG. 1 is a block diagram illustrating an example electronic device in a network environment, according to various embodiments.

FIG. 1 is a block diagram illustrating an example electronic device 101 in a network environment 100 according to various embodiments.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In various embodiments, at least one of the components (e.g., the connection terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and/or an external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) (e.g., speaker or headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., through wires) or wirelessly. According to an embodiment, the interface 177 may include, for example, a high-definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., the electronic device 102). According to an embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., an application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., an mmwave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
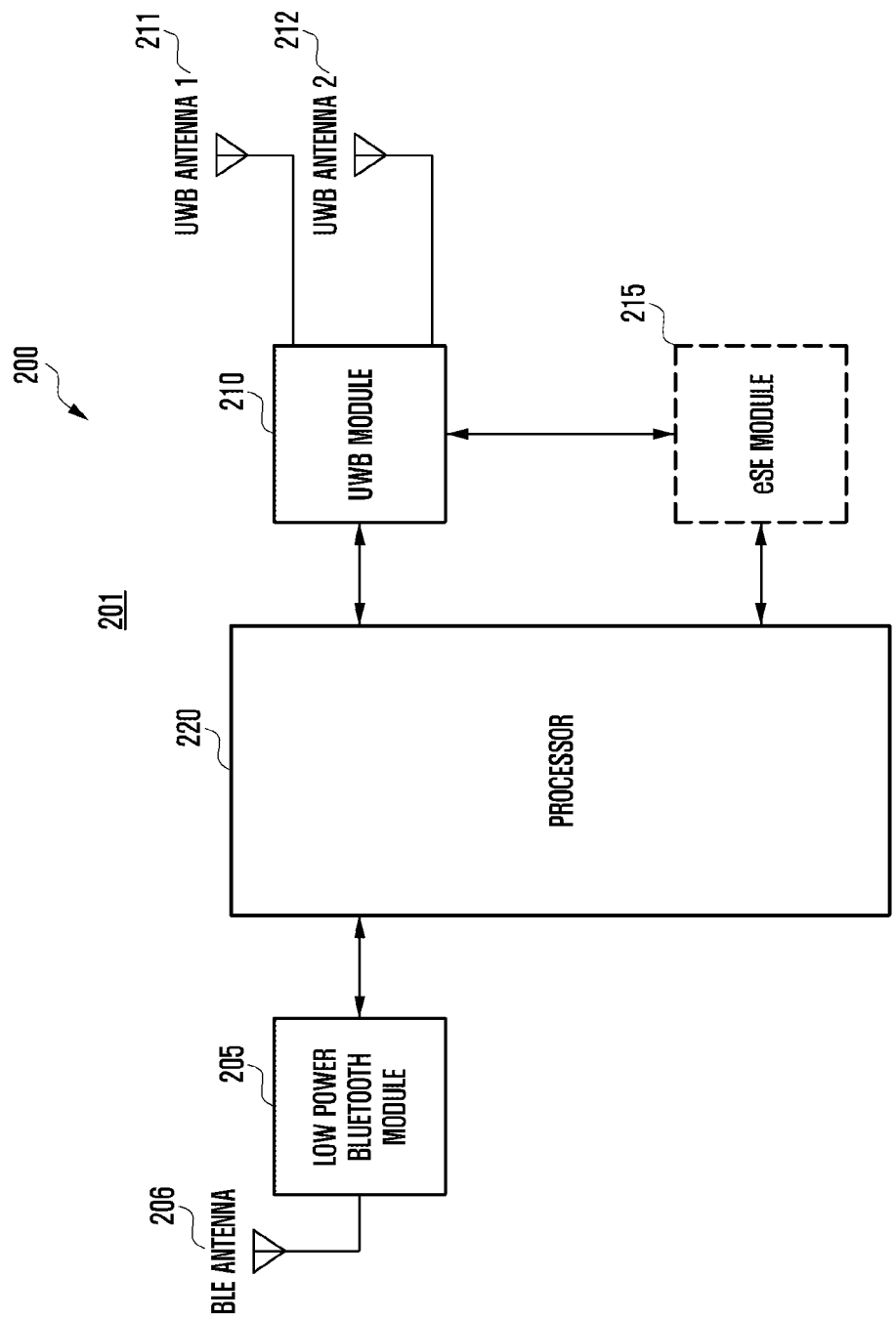
FIG. 2A is a diagram illustrating an example configuration of an electronic device, according to various embodiments.

FIG. 2A is a block diagram 200 illustrating an example configuration of an electronic device 201, according to various embodiments.

Referring to FIG. 2A, the electronic device 201 (e.g., the electronic device 101 of FIG. 1) according to various embodiments may include a Bluetooth low energy (BLE) module (e.g., including BLE circuitry) 205, a BLE antenna 206, an ultra-wideband (UWB) module (e.g., including UWB circuitry) 210, a first UWB antenna 211, a second UWB antenna 212, an embedded secure element (eSE) module (e.g., including a memory/storage and/or circuitry) 215, and/or a processor (e.g., including processing circuitry) 220 (e.g., the processor 120 of FIG. 1).

According to various embodiments, in the electronic device 201, one or more (e.g., the second UWB antenna 212) of the components included in FIG. 2 may be omitted, or one or more other components may be added. The Bluetooth low energy module 205, the UWB module 210, and/or the eSE module 215 may be operatively connected to the processor 220. The Bluetooth low energy module 205 or the UWB module 210 may be included in the communication module (e.g., including communication circuitry) 190 of FIG. 1.

According to various embodiments, the Bluetooth low energy module 205 may transmit/receive a Bluetooth low energy signal under the control of the processor 220. The Bluetooth low energy module 205 may transmit/receive a Bluetooth low energy signal through the BLE antenna 206.

According to various embodiments, the UWB module 210 may include a TX module (transmitter module including transmitting circuitry) for transmitting a UWB signal (e.g., poll, response, or final) for distance measurement from an external electronic device (e.g., the electronic device 102 or the electronic device 104 of FIG. 1) and a RX module (receiver module including receiving circuitry) for receiving the UWB signal. The UWB signal may be transmitted/received through the first UWB antenna 211 and/or the second UWB antenna 212. Although it has been described as having two UWB antennas 211 and 212 in FIG. 2, the present disclosure is not limited thereto. For example, more than two UWB antennas may be provided. For example, the UWB signal may be switched to be transmitted and/or received via the first UWB antenna 211 and/or the second UWB antenna 212, based on the control of the UWB module 210 and/or the processor 220. The UWB module 210 may operate under the control of the processor 220, and may transmit received UWB signal to the processor 220 or a communication path (e.g., serial peripheral interface) for receiving a control signal from the processor 220 may be formed.

According to various embodiments, the eSE module 215 may be a module that generates or stores credential information according to a situation. The eSE module 215 may transmit the generated credential information to the UWB module 210. The eSE module 215 may be connected to the UWB module 210 through inter integrated circuit (I2C) communication. The eSE module 215 may be included in the UWB module 210 or located outside.

Figure 2B:
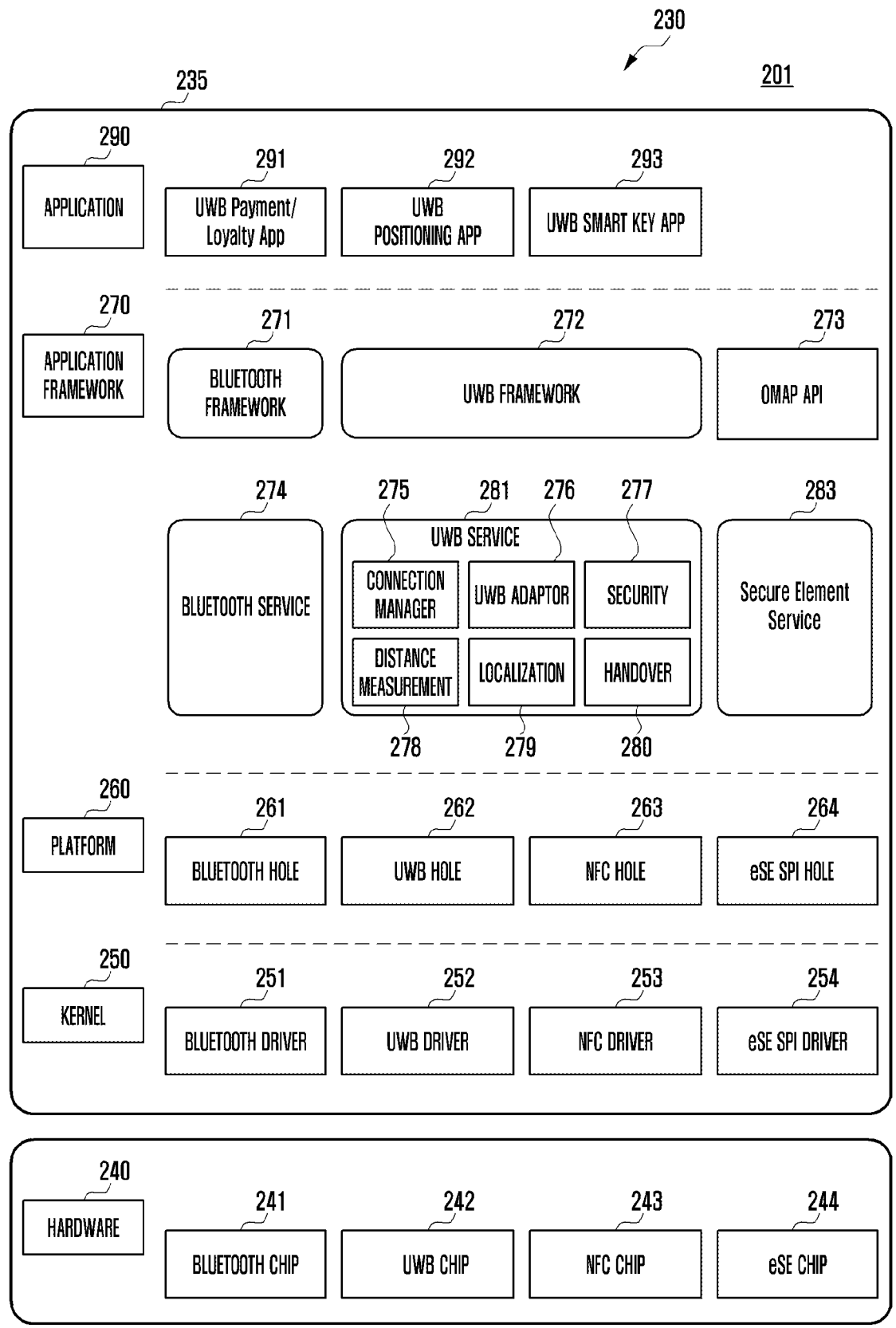
FIG. 2B is a block diagram illustrating an example configuration of a program module of an electronic device supporting a UWB function, according to various embodiments.

FIG. 2B is a block diagram 230 illustrating an example configuration of a program module of an electronic device 201 supporting a UWB function, according to various embodiments.

Referring to FIG. 2B, the electronic device 201 may include an operating system (OS) that controls resources related to the electronic device 201 and/or a program module 235 and hardware 240 including various applications running on the operating system. For example, the operating system may include an operating system such as Android, iOS, Windows, Symbian, Tizen, or Bada. FIG. 2B may show the program module 235 and the hardware 240 supporting the UWB function in the electronic device 201 of the Android operating system.

In an embodiment, the program module 235 may include a kernel 250, a platform 260, an application framework 270, and/or an application 290. At least a portion of the program module 235 may be preloaded on the electronic device 201 or may be downloaded from an external electronic device (e.g., the electronic devices 102 and 104 or the server 108). The kernel 250 may include a device driver for driving the hardware 240 (e.g., Bluetooth chip 241, UWB chip 242, NFC chip 243, or eSE chip 244) of the electronic device 201. The NFC chip 243 and the eSE chip 244 may be configured as one. For example, the device driver may include one or more of a Bluetooth driver 251, a UWB driver 252, an NFC driver 253, and an eSE SPI driver 254. The platform 260 may include one or more of a Bluetooth hole 261, a UWB hole 262, an NFC hole 263, and an eSE SPI hole 264 for controlling the device driver of the kernel 250.

In an embodiment, the application framework 270 may provide functions commonly required by the applications 290, or provide various functions to the application 290 so that the application 290 can efficiently use the limited system resources inside the electronic device 201. For example, the application framework 270 may include a Bluetooth framework 271, a UWB framework 272, an open multimedia applications platform (OMAP) API 273, a Bluetooth service 274, a UWB service 281, and/or a secure element service 283. The UWB service 281 may include a connection manager 275, a UWB adapter 276, security 277, distance measurement 278, localization 279, and/or handover 280 for supporting UWB related APIs. The electronic device 201 may measure the positions of a plurality of external electronic devices using the UWB adapter 276, the distance measurement 278, and/or the localization 279.

In an embodiment, the applications 290 may include a UWB payment/loyalty application 291, a UWB location measurement application 292, and a UWB smart key application 293.

FIG. 3A is a flowchart 300 illustrating an example method of operating an electronic device 201 for broadcasting a message for measuring a distance, according to various embodiments.

In FIG. 3A according to various embodiments of the present disclosure, it is assumed that the electronic device (e.g., the electronic device 201 of FIG. 2) is an electronic device (e.g., an initiator) serving as a master, and an external electronic device (e.g., the electronic device 102 or the electronic device 104 of FIG. 1) is an electronic device (e.g., a responder) acting as a slave. The operations illustrated in FIG. 3A may be performed by a processor of the electronic device 201 (e.g., the processor 230 of FIG. 2).

Referring to FIG. 3A, in operation 305, the electronic device 201 may broadcast a first message for range measurement in each of the plurality of distance measurement subsections (e.g., a plurality of ranging rounds) included in the first distance measurement section (e.g., a first ranging block). For example, the first message may include a poll message.

In an embodiment, the first distance measurement section (e.g., the first ranging block) may refer, for example, to a period repeated to measure a distance or a direction of at least one external electronic device. The first distance measurement section may include a plurality of distance measurement subsections (e.g., a plurality of ranging rounds). The distance measurement sub section may refer, for example, to a section in which the first message (e.g., a poll message) is broadcast from the electronic device 201, and distance measurement with at least a portion of at least one external electronic device is completed based on a second message (e.g., a response message) received in response to the first message.

In an embodiment, the electronic device 201 may broadcast a first message (e.g., a poll message) for requesting a location through designated communication. The designated communication may include ultra-wideband (UWB) communication. The UWB communication may include communication for measuring a distance (or location) of each electronic device in a two way ranging (TWR) method between the electronic device 201 and an external electronic device. For example, the TWR method may include a single side TWR (SS-TWR) method or a double side TWR (DS-TWR) method. The SS-TWR method may include a method of measuring a distance between electronic devices while exchanging a first message (e.g., a poll message or a poll frame) and a second message (e.g., a response message or a response frame) between electronic devices. The poll message may be transmitted in the form of a packet. In SS-TWR, the electronic device 201 may measure (or calculate) a distance to the external electronic device, based on the difference between the time of sending the first message (e.g., poll message) and the time of receiving the second message (e.g., response message) from the external electronic device. For distance measurement, the electronic device 201 serving as a master may broadcast a first message (e.g., a poll message), and the external electronic device serving as a slave and receiving the first message may transmit a second message (e.g., a response message) to the electronic device 201. In the DS-TWR method, when an external electronic device transmits a first message (e.g., a poll message), the electronic device 201 may transmit a second message (e.g., a response message) to the external electronic device, and the external electronic device may transmit a third message (e.g., a final message) to the electronic device 201, so that the external electronic device may identify the distance to the electronic device.

In an embodiment, the electronic device 201 may measure the distance to the external electronic device, based on contention. The electronic device 201 may control activation of the UWB module using a low-power communication module such as Bluetooth low energy (BLE) (e.g., the low-power Bluetooth module 205 of FIG. 2). For example, in order to receive a response message from at least one external electronic device, the electronic device 201 may activate (or turns on) the RX module of the communication module (e.g., the UWB module 210 of FIG. 2) during the distance measurement section. When the RX module of the communication module (e.g., the UWB module 210 of FIG. 2) is continuously activated, the current consumption of the electronic device 201 may be large, so the activation of the UWB module 210 may be controlled using the Bluetooth low energy module 205. The present disclosure is not limited thereto, and the electronic device 201 may control activation of the UWB module using Wi-Fi or a UWB in-band discovery scheme.

An operation of controlling the activation of the UWB module 210 using the aforementioned low-power Bluetooth module 205 will be described in greater detail below with reference to FIG. 4.

According to various embodiments, the first message (e.g., poll message) may include one or more of protocol type, service type, frame type, contents phase duration, interval, transmission offset, response control, ranging round, load balancing bit, current ranging round index, and/or available ranging round index mask. The format of the first message (e: poll message) will be described with reference to FIGS. 6 and 7 to be described later.

In an embodiment, at least one external electronic device that exists in the vicinity of the electronic device 201 and has activated a communication module (e.g., a UWB module) may receive the first message broadcast from the electronic device 201.

In an embodiment, in operation 310, the electronic device 201 may receive at least one second message in response to the first message from at least one external electronic device in each of the plurality of distance measurement subsections.

In an embodiment, the second message may include a response message to the first message (e.g., a poll message) transmitted by the electronic device 201. The second message may be transmitted to the electronic device 201 that has transmitted the first message (e.g., a poll message) from at least one external electronic device in a unicast manner.

In an embodiment, in operation 315, the electronic device 201 may determine information related to congestion in each of the plurality of distance measurement subsections, based on the number of at least one second message (e.g., response message) received in each of the plurality of distance measurement subsections.

In an embodiment, the electronic device 201 may interpret the received at least one second message to identify reception success or reception failure of the at least one second message. The electronic device 201 may calculate the number of at least one second message, based on the number of response messages that have been successfully received, the number of response messages that have failed to be received, and the number of response messages corresponding to the number of response messages that have failed to be received.

With respect to the operation of calculating the number of the aforementioned second messages (e.g., response messages), various embodiments will be described in greater detail below with reference to FIG. 8.

In an embodiment, the electronic device 201 may determine the utilization rate of each distance measurement subsection, based on the number of at least one second message received from at least one external electronic device in each of the distance measurement subsections and each of the distance measurement subsections of the plurality of distance measurement subsections. The electronic device 201 may determine the congestion level of each distance measurement subsection, based on the utilization rate of each distance measurement subsection. The electronic device 201 may determine information related to congestion of each distance measurement subsection, based on the determined congestion level of each distance measurement subsection. For example, the electronic device 201 may configure a third message (e.g., a poll message) to be broadcast in operation 320, which will be described later, based on the determined congestion related information of each distance measurement subsection.

In an embodiment, the electronic device 201 may configure a load balancing bit and an available ranging round index mask of each distance measurement subsection, based on congestion related information in each of the plurality of distance measurement subsections. In an embodiment, the available ranging round index mask may be omitted based on the value of the load balancing bit. The electronic device 201 may configure the current ranging round index, based on the distance measurement subsection in which the third message is to be broadcast, for example, the duration of the ranging round. According to the above-described embodiment, the electronic device 201 may configure the load balancing bit, the current ranging round index, and/or an available ranging round index mask, and configure the third message, based thereon.

In an embodiment, the electronic device 201 may map information related to each distance measurement subsection and congestion of each distance measurement subsection to store the information in a memory (e.g., the memory 130 of FIG. 1).

In an embodiment, in operation 320, the electronic device 201 may broadcast a third message (e.g., a poll message) including information related to congestion in the first distance measurement subsection (e.g., the first ranging round) among a plurality of distance measurement subsections (e.g., a plurality of ranging blocks) included in the second distance measurement section (e.g., a second ranging block). In an embodiment, the electronic device 201 may repeatedly perform operation 320 in each of the plurality of distance measurement subsections during the second distance measurement period.

In connection with the above-described operations 315 and 320, various embodiments will be described in greater detail below with reference to FIGS. 8, 9, 10 and 11.

In various embodiments, as the electronic device 201 receives a response message from the at least one external electronic device in response to the broadcast poll message, the electronic device 201 may determine a distance (or a direction, an angle) with respect to at least one external electronic device. The electronic device 201 may perform a function such as opening a door, based on the determined distance (or direction, or angle) with respect to at least one external electronic device.

Figure 3B:
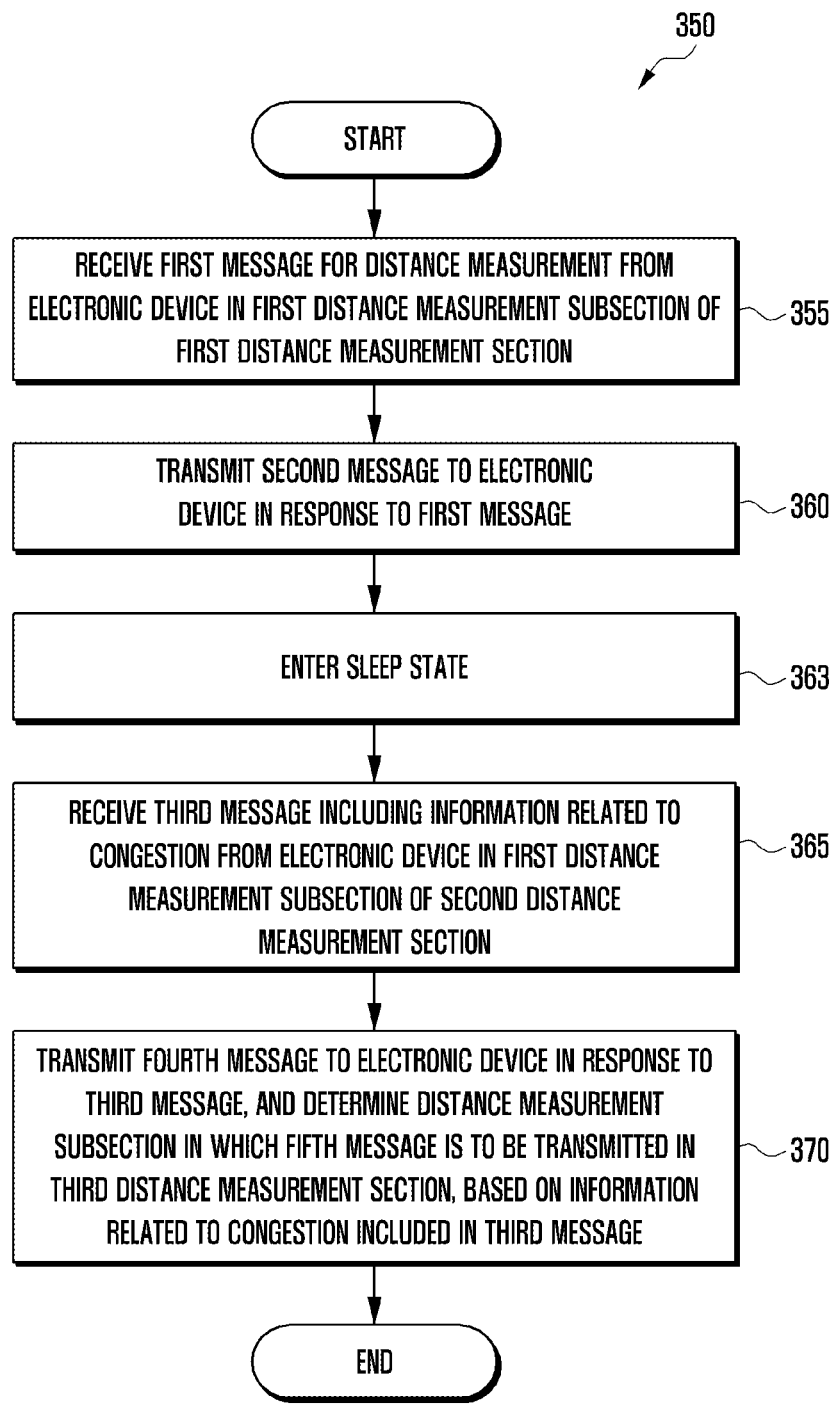
FIG. 3B is a flowchart illustrating an example method of operating an electronic device for transmitting a response message in response to a message for measuring a distance, according to various embodiments.

FIG. 3B is a flowchart 350 illustrating an example method of operating an electronic device for transmitting a response message in response to a message for measuring a distance, according to various embodiments.

In FIG. 3B according to various embodiments, it is assumed that an external electronic device (e.g., the electronic device 102 or the electronic device 104 of FIG. 1) is an electronic device (e.g., a responder) serving as a slave, and an electronic device (e.g., the electronic device 201 of FIG. 2) is an electronic device (e.g., an initiator) serving as a master.

Referring to FIG. 3B, in operation 355, the external electronic device may receive a first message (e.g., poll message) for distance measurement from the electronic device 201 in the first distance measurement subsection (e.g., the first ranging round of the first ranging block) of the first distance measurement section. For example, the external electronic device may receive the first message for measuring the distance from the electronic device 201 through designated communication. The designated communication may include ultra-wideband (UWB) communication.

In an embodiment, in operation 360, the external electronic device may transmit a second message (e.g., a response message) to the electronic device 201 in response to the first message (e.g., a poll message). For example, based on contention phase information included in the first message received from the electronic device 201, the external electronic device may transmit a second message (e.g., a response message) to the electronic device 201 within the time of the contention phase.

In an embodiment, the second message (e.g., a response message) may include one or more of a protocol type, a service type, a frame type, reply time information, and reply addition information. For example, the protocol type may include information on a communication protocol used for UWB communication. The service type may include information on an application performed through UWB communication. The frame type may indicate the format of a message, and may include, for example, information indicating a second message (e.g., a response message). The protocol type or service type of the second message (e.g., response message) may be the same as the protocol type or service type of the first message (e.g., poll message). The reply time information may include time information at which the external electronic device receives a first message (e.g., a poll message) from the electronic device 201 and time information at which a second message (e.g., a response message) is transmitted. As another example, the reply time information may include processing time information required for the external electronic device to receive a first message (e.g., a poll message) and transmit a second message (e.g., a response message). The reply addition information may include information necessary for calculating angle of arrival (AOA) information for the electronic device 201 in the external electronic device. For example, the reply addition information may include one or more of horizontal angle (azimuth), horizontal angle reliability (azimuth FoM), vertical angle (elevation), vertical angle reliability (elevation FoM), SNR peak path information, SNR first path information, difference between the highest point and the first, and index information of the first path.

In an embodiment, the protocol type, the service type, the frame type, or the reply addition information of the second message (e.g., response message) may have a capacity of 1 byte or less than or greater than 1 byte. The reply time information of the second message (e.g., a response message) may have a capacity of 4 bytes or less or larger than 4 bytes. However, the present disclosure is not limited thereto.

In an embodiment, the external electronic device may enter a sleep state in operation 363. The sleep state may include a state in which an RX module of a communication module (e.g., UWB module) of an external electronic device is deactivated (or turned off). After transmitting the second message, the external electronic device may reduce current consumption by inactivating the RX module of the communication module.

In an embodiment, in operation 365, the external electronic device may receive a third message (e.g., a poll message) including information related to congestion from the electronic device 201 in the first distance measurement subsection of the second distance measurement section (e.g., the first ranging round of the second ranging block).

In an embodiment, in operation 370, the external electronic device may transmit a fourth message (e.g., a response message) to the electronic device 201 in response to the third message (e.g., a poll message), and determine a distance measurement subsection (e.g., ranging round) in which the fifth message is to be transmitted in the third distance measurement section (e.g., a third ranging block), based on the information related to congestion included in the third message.

In connection with operation 370 described above, various embodiments will be described in greater detail below with reference to FIGS. 12A, 12B and 12C.

Figure 4:
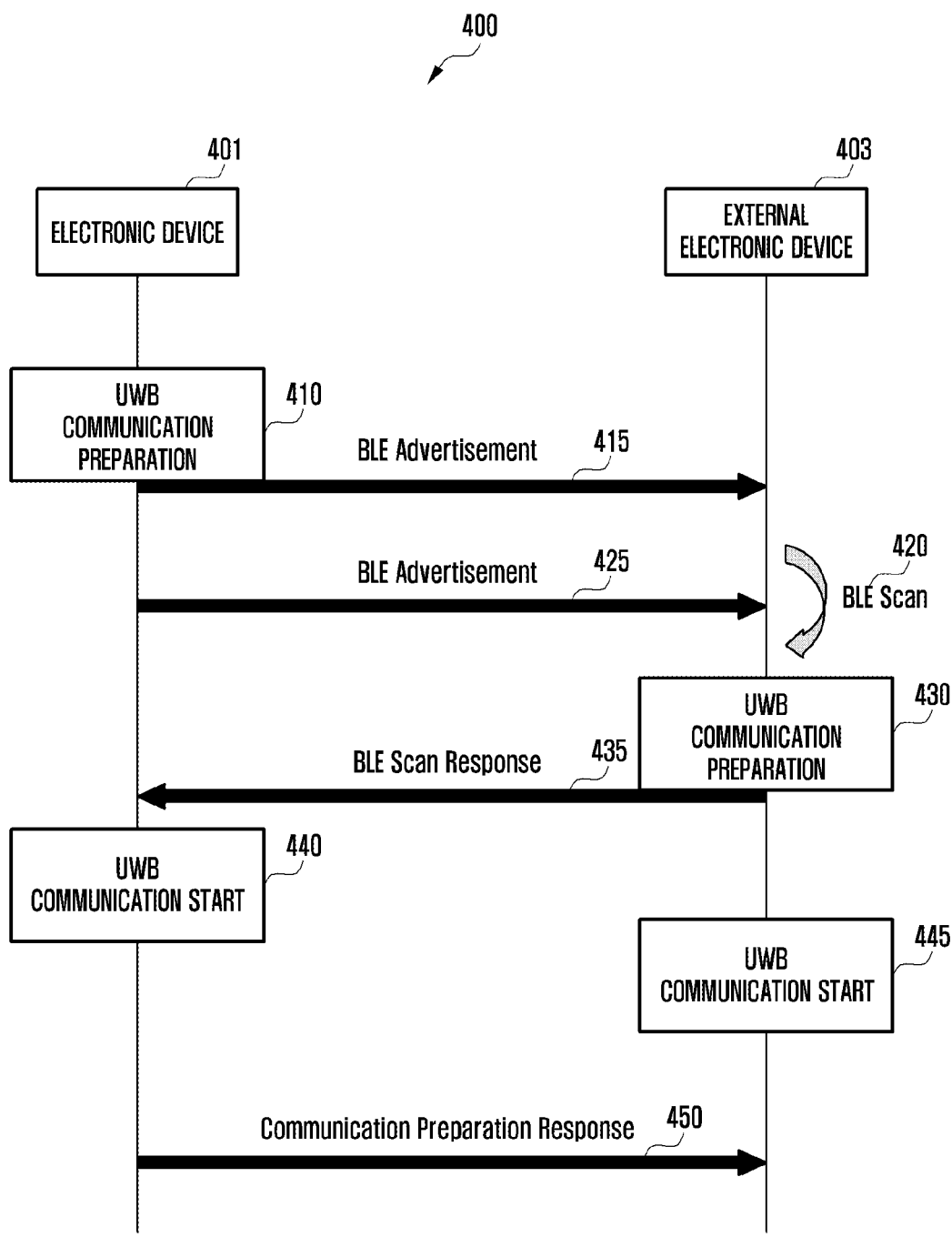
FIG. 4 is a signal flow diagram illustrating an example method of controlling activation of a UWB module using a low-power Bluetooth module, according to various embodiments.

FIG. 4 is a signal flow diagram 400 illustrating an example method of controlling activation of a UWB module using a Bluetooth low energy module 205, according to various embodiments.

Referring to FIG. 4, in operation 410, an electronic device 401 (e.g., the electronic device 201 of FIG. 2) may prepare for communication, for example, UWB communication. For example, operation 410 may include an operation of determining whether the electronic device 401 supports communication, for example, UWB communication.

In an embodiment, in operation 415, the electronic device 401 may broadcast a message (e.g., BLE advertising) including communication (e.g., UWB communication) support information. For example, a message including communication support information (e.g., BLE advertising) may be 1 byte. The messages (e.g., BLE advertising) may include one or more of communication support information (e.g., bit 7), communication status information (e.g., bit 6), channel information (e.g., bit 5), preamble code index (e.g., bits 4-3), and RFUs (e.g., bits 2-0). For example, when the electronic device 401 supports UWB communication, the communication support information of the message (e.g., BLE advertising) may be configured to 1, and communication status information may be configured to 0. The electronic device 401 may broadcast a message including communication (e.g., UWB communication) support information through the Bluetooth low energy module (e.g., the Bluetooth low energy module 205 of FIG. 2).

In an embodiment, the external electronic device 403 may scan a message in operation 420. For example, the external electronic device 403 may scan the message through the Bluetooth low energy module 205.

In an embodiment, in operation 425, the electronic device 401 may broadcast a message (e.g., BLE advertising) including communication (e.g., UWB communication) support information. For example, the electronic device 401 may periodically broadcast the same message as the message transmitted in operation 415.

In an embodiment, in operation 430, the external electronic device 403 may prepare for communication, for example, UWB communication. In operation 430, the external electronic device 403 may scan the messages (e.g., BLE advertising) transmitted in operations 415 and 425 to determine whether communication, that is, UWB communication, is supported.

In an embodiment, in operation 435, the external electronic device 403 may transmit a response message (e.g., BLE scan response) including communication (e.g., UWB communication) support information to the electronic device 401. For example, since the communication state information of the UWB module (e.g., the UWB module 210 of FIG. 2) of the electronic device 401 in a message (e.g., BLE advertising) received from the electronic device 401 is 0, the external electronic device 403 may transmit a response message including communication support information or communication status information to the electronic device 401. For example, in the response message transmitted in operation 435, both communication support information and communication state information may be configured to 1.

In an embodiment, the electronic device 401 may start communication, for example, UWB communication in operation 440. For example, since both communication support information and communication state information included in a response message (e.g., BLE scan response) received from the external electronic device 403 are 1, the electronic device 401 may change the communication state information 0 to 1 in operation 415, and activate (or turn on) the RX module of the communication module, for example, the UWB communication module (e.g., the UWB module 210 of FIG. 2).

In an embodiment, the external electronic device 403 may start communication, for example, UWB communication, in operation 445. For example, the external electronic device 403 may transmit a response message (e.g., BLE scan response) (e.g., in operation 435), and after a predetermined time elapses, start communication in operation 445, that is, UWB communication. In an embodiment, the external electronic device 403 may start communication, for example, UWB communication, at substantially the same time as transmitting a response message (e.g., BLE scan response).

In an embodiment, in operation 450, the electronic device 401 may transmit a communication preparation complete message to the external electronic device 403 (e.g., at least one external electronic device that has transmitted a response message). The electronic device 401 may transmit a communication preparation complete message in which both the communication support information and the communication state information are configured to 1 to the external electronic device 403.

Figure 5:
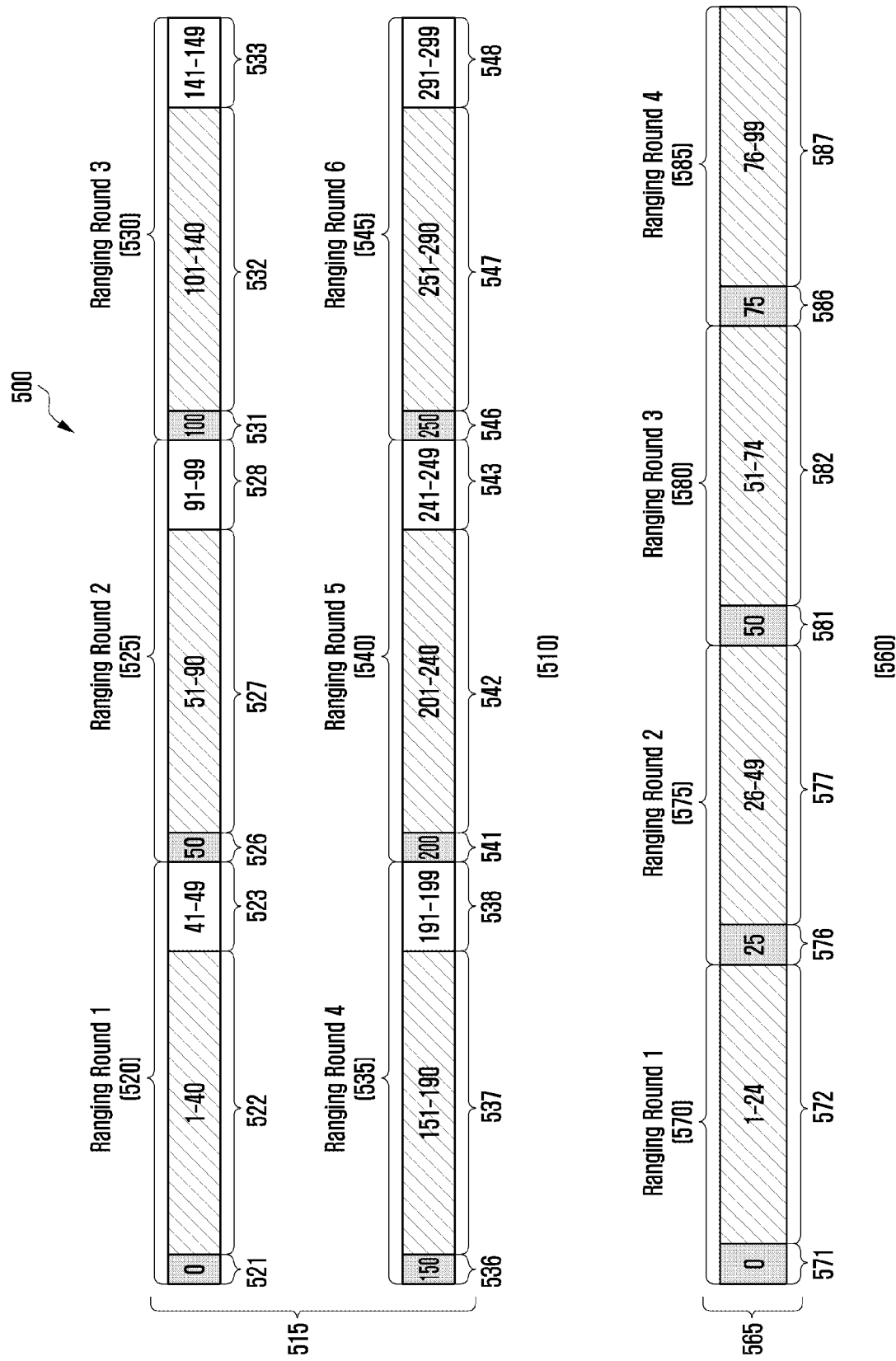
FIG. 5 is a diagram illustrating an example ranging block structure, according to various embodiments.

FIG. 5 is a diagram 500 illustrating an example ranging block structure, according to various embodiments.

In various embodiments, the electronic device (e.g., the electronic device 201 of FIG. 2) may perform an operation of measuring the distance of the external electronic device (e.g., the external electronic device 403 of FIG. 4) in the distance measurement section. For example, the operation of measuring the distance of the external electronic device 403 may include obtaining distance information from the external electronic device 403, coordinate information of the external electronic device 403, and/or angle information with the external electronic device 403.

In various embodiments, the distance measurement section may refer, for example, to a period for measuring a distance or a direction of at least one external electronic device. The distance measurement section may include a plurality of distance measurement subsections. The distance measurement subsection may refer, for example, to a section in which distance measurement with at least some external electronic devices is completed, based on a response message received from at least some of the at least one external electronic device in response to a poll message (e.g., the first message) broadcast from the electronic device 201.

According to various embodiments, in FIG. 5, the distance measurement section may be described as a ranging block, and a plurality of distance measurement subsections may be described as a plurality of ranging rounds.

Referring to FIG. 5, the electronic device 201 may repeat a ranging block (e.g., a distance measurement period) at every ranging interval, and may perform ranging (e.g., a distance measurement) with at least one external electronic device. In an embodiment, the ranging interval may be a multiple of the number of sections (e.g., the number of polls) in which the poll message (e.g., the first message) is transmitted. The ranging blocks 515 and 565 may include a plurality of ranging rounds. Each ranging round may include a plurality of ranging slots (not shown). Each ranging slot (not shown) may indicate a section for transmitting one ranging frame.

In an embodiment, it is assumed that the ranging interval is 300 ms, the length of a contention phase (CP) is 40 ms, and the number of polls is six.

In various embodiments, the length of the CP may be 67 ms or less. For example, a timestamp of a reply time transmitted by at least one external electronic device (e.g., a responder) included in a response message may be 4 bytes, which may be expressed up to 67 ms. Accordingly, the length of the CP may be 67 ms or less. In various embodiments, the length of the CP may be less than "ranging interval/number of poles)−1". For example, since the first slot among a plurality of slots of each ranging round is used by a poll, a slot for using a poll may be excluded, and accordingly, the length of the CP may be smaller than "(ranging interval/number of poles)−(number of slots for using poles (e.g., "1")")".

For example, as shown in reference numeral <510>, the ranging block 515 (e.g., a distance measurement section) may include a plurality of ranging rounds (e.g., a plurality of distance measurement subsections), for example, a first ranging round (ranging round1) 520, a second ranging round (ranging round2) 525, a third ranging round (ranging round3) 530, a fourth ranging round (ranging round4) 535, a fifth ranging round (ranging round5) 540, and a sixth ranging round (ranging round6) 545. Each of the plurality of ranging rounds 520, 525, 530, 535, 540, and 545 may include a plurality of ranging slots (not shown).

In an embodiment, each of the plurality of ranging rounds 520, 525, 530, 535, 540, 545 may include a first section (e.g., 521, 526, 531, 536, 541, 546, which is the first slot of each ranging round), which is a section in which a poll message (e.g., a first message) is broadcast from the electronic device 201 (e.g., poll section), a second section (e.g., 522, 527, 532, 537, 542, 547) (e.g., CP (contention phase) section), which is a section in which at least one response message (e.g., a second message) is randomly transmitted from at least one external electronic device (e.g., a responder) that has received the poll message, and/or a third section (523, 528, 533, 538, 543, and 548) (e.g., idle section) that is a section in which the electronic device 201 enters a sleep state.

In an embodiment, the electronic device 201 may broadcast a poll message (e.g., a first message) in the first section (e.g., pole section), for example, in the first slot (e.g., 521, 526, 531, 536, 541, 546) of each ranging round (520, 525, 530, 535, 540, or 545). The electronic device 201 may activate the RX of the communication module (e.g., the UWB module 210 of FIG. 2) for 40 ms which is the second section (e.g., CP section) (e.g., 522, 527, 532, 537, 542, 547) to wait for at least one response message (e.g., a second message) from at least one external electronic device. In response to the poll message received from the electronic device 201, the at least one external electronic device may transmit a response message by randomly selecting a slot within 40 ms, which is the second section (e.g., CP section) (e.g., 522, 527, 532, 537, 542, 547). At least one external electronic device may enter a sleep state after transmitting the response message, and may perform ranging again by waking up after 300 ms, which is a ranging interval, after entering the sleep state. The electronic device 201 may receive at least one response message from at least one external electronic device in the second section (e.g., CP section) (e.g., 522, 527, 532, 537, 542, 547), and enter a sleep state (e.g., the third section (idle section)) (e.g., 523, 528, 533, 538, 543, 548) when exceeding 40 ms (e.g., the length of the CP section).

In an embodiment, at least one external electronic device (e.g., a responder) may perform ranging in one ranging round among a plurality of ranging rounds 520, 525, 530, 535, 540 and 545 of the ranging block 515. For example, at least one external electronic device may perform ranging in the same ranging round of a next ranging block (e.g., a second ranging block). At least one external electronic device may transmit a response message, enter a sleep state, and then wake up after a ranging interval of 300 ms to perform ranging again. For example, when the external electronic device transmits a response message in the third ranging round 530 in response to the poll message broadcast from the electronic device 201 among the first ranging round (ranging round1) 520, the second ranging round (ranging round2) 525, the third ranging round (ranging round3) 530, the fourth ranging round (ranging round4) 535, the fifth ranging round (ranging round5) 540, and a sixth ranging round (ranging round6) 545 of the first distance measurement section, after transmitting the response message, the external electronic device may enter the sleep state, wake up after 300 ms of the ranging interval, and transmit the response message in the same ranging round of the second distance measurement section, for example, in the third ranging round 530.

According to various embodiments, the third sections (e.g., idle sections) 523, 528, 533, 538, 543, and 548 may be omitted.

In the above embodiment, the ranging block 515 has been described as including six ranging rounds 520, 525, 530, 535, 540, and 545, but is not limited thereto.

In an embodiment, it is assumed that the ranging interval is 100 ms, the length of the CP is 24 ms, and the number of polls is four.

For example, as shown in reference numeral <560>, the ranging block 565 (e.g., a distance measurement period) may include, for example, four ranging rounds (e.g., four distance measurement subsections), for example, a first ranging round (ranging round1) 570, a second ranging round (ranging round2) 575, a third ranging round (ranging round3) 580, and a fourth ranging round (ranging round4) 585. In an embodiment, each of the plurality of ranging rounds 570, 575, 580, and 585 may include a first section 571, 576, 581, 586 (e.g., a poll section) in which a poll message (e.g., a first message) can be broadcast and a poll message (e.g., a first message) and a second section 572, 577, 582, 587 (e.g., CP section), which is a section in which at least one response message (e.g., second message) is randomly transmitted from at least one external electronic device (e.g., responder) that has received the poll message (e.g., the first message).

In an embodiment, the electronic device 201 may broadcast a poll message (e.g., a first message) in the first section (e.g., poll section), for example, in the first slot (e.g., 571, 576, 581, 586) of each ranging round (570, 575, 580, or 585). The electronic device 201 may activate the RX of the communication module (e.g., the UWB module 210 of FIG. 2) for 24 ms, which is the second section (e.g., CP section) (e.g., 572, 577, 582, 587) to wait for at least one response message (e.g., a second message) from at least one external electronic device. At least one external electronic device may transmit a response message by randomly selecting a slot within 40 ms, which is a second section (e.g., CP section) (e.g., 572, 577, 582, 587) in response to the poll message received from the electronic device 201.

Figure 6:
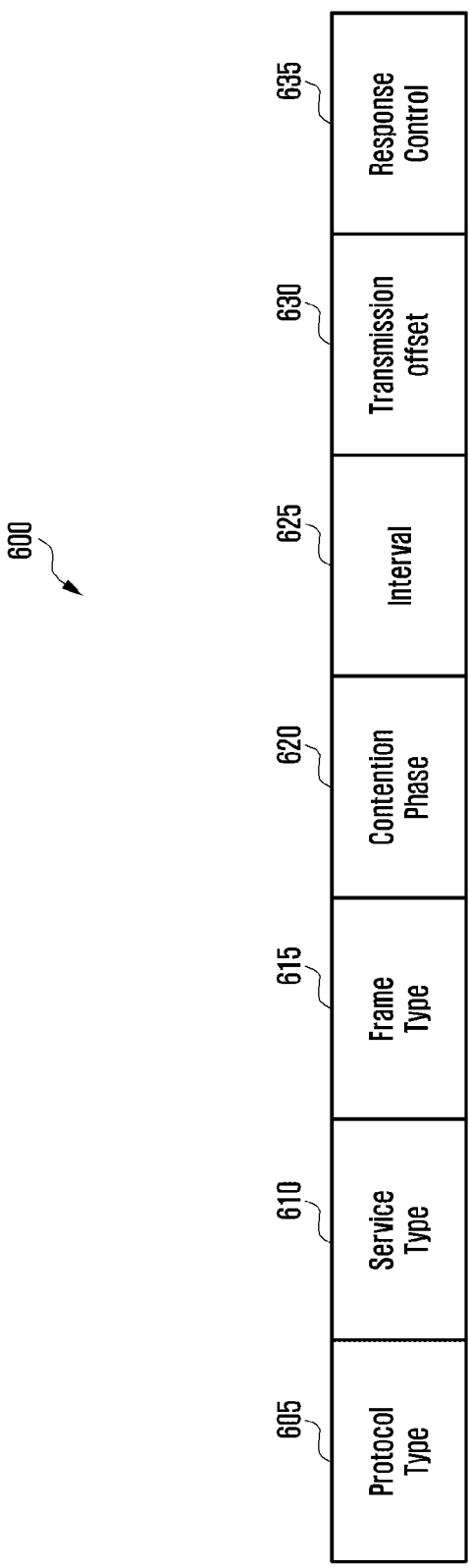
FIG. 6 is a diagram illustrating an example format of a message for measuring a distance, according to various embodiments.

FIG. 6 is a diagram 600 illustrating an example format of a message for distance measuring, according to various embodiments.

Referring to FIG. 6, a poll message (e.g., a first message) broadcast to at least one external electronic device for distance measurement may include one or more of a protocol type 605, a service type 610, a frame type 615, a contention phase (CP) 620, an interval 625, a transmission offset 630, or a response control 635.

In an embodiment, the protocol type 605 may include information on a communication protocol used for UWB communication. The service type 610 may include information on an application performed through UWB communication. The frame type 615 may include information indicating the format of the message. For example, in the case of the SS-TWR method, the frame type 615 may include one or more of a poll message (e.g., a first message) and a response message (e.g., a second message). For another example, in the case of the DS-TWR method, the frame type 615 may include one or more of a poll message (e.g., a first message), a response message (e.g., a second message), and a final message (e.g., a third message).

In an embodiment, the contention phase 620 may represent the time of the contention phase, and may include information about the time actually used in the distance measurement subsection (e.g., ranging round). For example, the contention phase 620 may include information on the time when the electronic device 201 transmits a poll message (e.g., a first message) and activates the RX of a communication module, for example, a UWB module (e.g., the UWB module 210 of FIG. 2) in order to receive a response message (e.g., a second message) from at least one external electronic device.

In an embodiment, the interval 625 may refer, for example, to a section at which the electronic device 201 transmits a poll message (e.g., a first message), and refer, for example, to a scheduled time period during which a poll message (e.g., the first message) is broadcast in the next distance measurement section (e.g., the next ranging block). For example, the interval 625 may refer, for example, to a time between broadcasting the first poll message in the first distance measurement section and broadcasting the second poll message in the second distance measurement section. The interval 625 may vary depending on at least one of a transmission offset number used for transmitting the first poll message, the number of transmission offsets included in the transmission offset 630, and a transmission offset number.

In an embodiment, the transmission offset 630 may refer, for example, to an offset value to be used when transmitting a next poll message and a response message to the next poll message. The transmission offset 630 may include one or more of the number of transmission offsets, a transmission offset number, and reception offset configuration information.

According to an embodiment, the response control 635 may include additional requested information in addition to information for distance measuring to the external electronic device (e.g., response time information). For example, the response control 635 is necessary for the electronic device 201 to measure AOA information with an external electronic device, and may include additional information measured by the external electronic device. The response control 635 may include one or more of horizontal angle information, vertical angle information, signal to noise ratio (SNR) peak path information, SNR first path information, difference information between the highest point and the first, index information of the first path, reserved for future use (RFU), and whether reliability of the response time is requested.

In an embodiment, the protocol type 605, the service type 610, the frame type 615, the contention phase 620, the transmission offset 630, or the response control 635 of the poll message may have a capacity of 1 byte or less or greater than 1 byte. The interval 625 of the poll message may have a capacity of 3 bytes or less or greater than 3 bytes. However, the present disclosure is not limited thereto.

Figure 7:
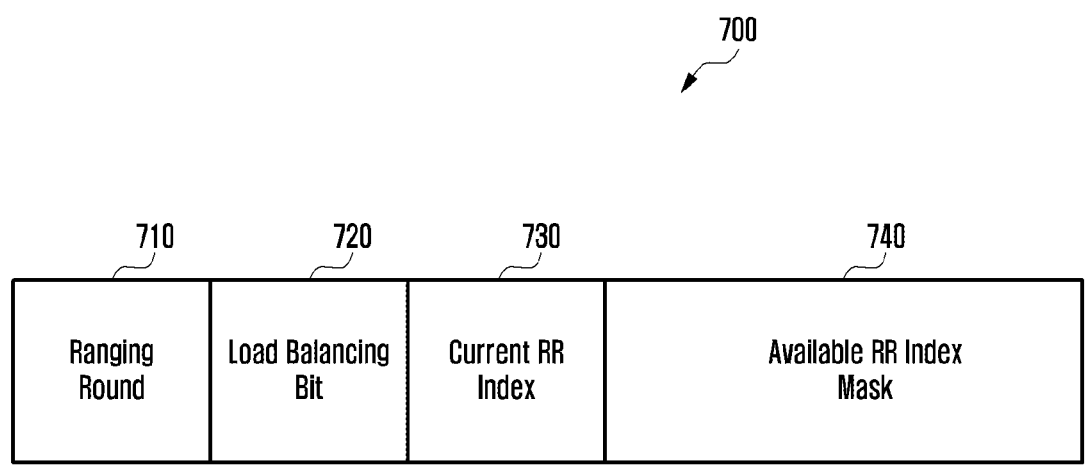
FIG. 7 is a diagram illustrating an example field for information related to congestion for a distance measurement subsection included in a format of a distance measurement message, according to various embodiments.

FIG. 7 is a diagram 700 illustrating an example field for information related to congestion for a distance measurement subsection included in a format of a distance measurement message, according to various embodiments.

Referring to FIG. 7, as described above with reference to FIG. 6, a poll message (e.g., a first message) broadcast to at least one external electronic device for distance measurement may include a protocol type 605, a service type 610, a frame type 615, a contention phase (CP) 620, an interval 625, a transmission offset 630, response control 635, in addition, it may include a ranging round 710, a load balancing bit 720, a current ranging round index 730, and an available ranging round index mask 740.

In an embodiment, the ranging round 710 may include the number of ranging rounds of the ranging block.

In an embodiment, the electronic device (e.g., the electronic device 201 (e.g., initiator) of FIG. 2) may broadcast a poll message (e.g., a poll frame or a first message) in a first ranging round of the first ranging block (e.g., a first section of the first ranging round (e.g., a poll section)), and then, may receive at least one response message from at least one external electronic device in the first ranging round (e.g., a second section (e.g., CP section) of the first ranging round). The electronic device 201 may determine information related to congestion in the first ranging round, based on the number of at least one response message received in the first ranging round. For example, the electronic device 201 may determine information related to congestion of each ranging round according to the embodiments of FIGS. 8 and 9 described in greater detail below.

In an embodiment, the electronic device 201 may configure the load balancing bit 920 of the poll message to be broadcast in the first ranging round of the second ranging block, which is the next ranging block, to "0" or "1", based on the information related to congestion of the first ranging round. For example, when the information related to congestion of the first ranging round is at a second level (e.g., normal) or a third level (e.g., busy), the electronic device 201 may configure the load balancing bit 720 of the poll message to be broadcast in the first ranging round of the second ranging block, which is the next ranging block, to "1". When the information related to congestion of the first ranging round is at a first level (e.g., quiet), the electronic device 201 may configure the load balancing bit 720 of the poll message to be broadcast in the first ranging round of the second ranging block, which is the next ranging block, to "0".

The level of the information related to congestion as a reference for configuring the value of the above-described load balancing bit 720 according to various embodiments is merely an example, and a criteria for configuring the value of the load balancing bit 720 may vary. For example, when the information related to congestion is at the third level (e.g., busy), the value of the load balancing bit 720 of the poll message to be broadcast in the same ranging round of the next ranging block may be configured to "1", and when the information related to congestion is at the first level (quiet) or the second level (normal), the value of the load balancing bit 720 may be configured to "0".

Although the operation of determining the information related to congestion of the first ranging round of the above-described first ranging block and configuring a poll message to be broadcast in the first ranging round of the second ranging block according to various embodiments is described, it may be performed in each of a plurality of ranging rounds of the first ranging block (e.g., 520, 525, 530, 535, 540, 545 or 570, 575, 580, 585 of FIG. 5), and a poll message to be broadcast in each of a plurality of ranging rounds of the second ranging block may be configured based on this.

In an embodiment, the current ranging round index 730 may include an index of a ranging round in which the current poll message is transmitted, and may start from "0".

In an embodiment, the available ranging round index mask 740 may be added when the load balancing bit 720 is "1". When the load balancing bit 720 is "0", the available ranging round index mask 740 may be omitted.

In an embodiment, the electronic device 201 may update information related to congestion of each ranging round whenever each ranging round (e.g., a distance measurement subsection) (e.g., 520, 525, 530, 535, 540, 545 of FIG. 5) ends, based on at least one response message (e.g., a second message) received from at least one external electronic device in each ranging round.

Various embodiments will be described in greater detail below with reference to FIGS. 10 and 11 with respect to information related to congestion in a CP section and an available ranging round index mask according to various embodiments.

FIG. 8 is a diagram 800 illustrating an example of identifying information related to congestion in each of a plurality of distance measurement subsections included in a distance measurement section, according to various embodiments. FIG. 9 is a diagram 900 illustrating an example of identifying information related to congestion in each of a plurality of distance measurement subsections included in a distance measurement section, according to various embodiments.

An electronic device (e.g., the electronic device 201 of FIG. 2) according to various embodiments may determine information related to congestion on each of a plurality of distance measurement subsections (e.g., ranging rounds 520, 525, 530, 535, 540, 545 or 570, 575, 580, 585 of FIG. 5) included in the distance measurement section (e.g., the ranging block (e.g., the ranging block 515 or 565 of FIG. 5)).

In an embodiment, the electronic device 201 may calculate a CP utilization rate 810, based on the length of a contention phase (CP) and at least one response message (e.g., a second message) received from at least one external electronic device in the CP period. For example, the electronic device 201 may interpret the response message to identify reception success or failure of the response message. For example, failure to receive the response message may include an error in decoding (or parsing) the response message. The electronic device 201 may determine that a collision between response messages has occurred based on the failure to receive the response message.

In an embodiment, the electronic device 201 may calculate the number of response messages received from at least one external electronic device in the CP period, based on the number of response messages that have been successfully received, the number of response messages that have not been received, and the number of response messages increased by the number of response messages that have failed to be received. For example, assuming that the number of successfully received response messages is two and the number of received unsuccessful response messages is one, the electronic device 201 may calculate the number of final response messages (e.g., 4), based on "the number of successfully received response messages (e.g., 2)+the number of failed response messages (e.g., 1)+the number of response messages corresponding to the number of failed response messages (e.g., 1)". As another example, when the number of successfully received response messages is two and the number of received unsuccessful response messages is two, the electronic device 201 may calculate the number of final response messages (e.g., six), based on "the number of successfully received response messages (e.g., 2)+the number of failed response messages (e.g., 2)+the number of response messages corresponding to the number of failed response messages (e.g., 2)".

In an embodiment, the electronic device 201 may determine the CP utilization rate 810, based on a value calculated by "length of CP/number of final response messages".

In an embodiment, the degree of congestion 820 of each distance measurement subsection (e.g., each ranging round) may be determined based on the CP utilization rate 810. For example, referring to FIG. 8, when the CP usage rate 810 calculated based on the length of the CP and a response message received from at least one external electronic device in the CP section is included in the first range (e.g., 0% to 10%), the electronic device 201 may determine the degree of congestion 820 of the CP as the first level (e.g., quiet) 830. When the utilization rate 810 of the CP is included in the second range (e.g., 11% to 25%), the electronic device 201 may determine the degree of congestion 820 of the CP as the second level (e.g., normal) 840. When the utilization rate 810 of the CP is included in the third range (e.g., 26% to 100%), the electronic device 201 may determine the degree of congestion 820 of the CP as the third level (e.g., busy) 850.

In an embodiment, the electronic device 201 may broadcast a poll message including the degree of congestion of the CP. In this case, when the degree of congestion 820 of the CP is a third level (e.g., busy) 850 in the section in which the current poll message is broadcast among the plurality of distance measurement subsections, the electronic device 201 may check only the distance measurement subsection in which the congestion degree 820 of the CP is a first level (e.g., quiet) 830 as a usable distance measurement subsection, and broadcast to at least one external electronic device. However, the present disclosure is not limited thereto.

In FIG. 8 according to various embodiments, it has been described that the degree of congestion 820 of the CP according to the CP utilization rate 810 is divided into three levels, but the present disclosure is not limited thereto. For example, referring to FIG. 9, when the CP utilization rate 910 calculated based on the length of the CP and the number of at least one response message received from at least one external electronic device in the CP section is within a first range (e.g., 0%-10%), the electronic device 201 may determine the congestion degree 920 of the CP as the first level (e.g., quiet) 930. When the CP utilization rate 910 is included in a second range (e.g., 11% to 25%), the electronic device 201 may determine the congestion degree 920 of the CP as the second level (e.g., normal) 940. When the CP utilization rate 910 is included in a third range (e.g., 26% to 40%), the electronic device 201 may determine the congestion level 920 of the CP as the third level (e.g., busy) 950. When the CP utilization rate 910 is included in a fourth range (e.g., 41% to 100%), the electronic device 201 may define the degree of congestion 920 of the CP as a fourth level (e.g., overcrowded) 960.

In an embodiment, the electronic device 201 may broadcast a poll message including the congestion level of the CP. In this case, when the congestion level 920 of the CP is the fourth level (e.g., overcrowded) 960 in the section in which the current poll message is broadcast among the plurality of distance measurement subsections, the electronic device 201 may check only the distance measurement subsections in which the congestion degree 920 of the CP is a first level (e.g., quiet) 930 and a second level (e.g., normal) 940 as a usable distance measurement subsection to broadcast to at least one external electronic device. However, the present disclosure is not limited thereto.

Various embodiments will be described in greater detail below with reference to FIGS. 10, 11, 12A, 12B and 12C, in relation to an operation of broadcasting a poll message including the above-described congestion levels 820 and 920 of the CP.

FIG. 9 according to various embodiments may further subdivide the congestion level (e.g., the first level 930 to the fourth level 960) of the CP as compared with the embodiment of FIG. 8.

As the congestion level of the CP is subdivided according to various embodiments, the external electronic devices that transmit a response message in a distance measurement subsection having a high congestion level may be further subdivided into distance measurement subsections having a low congestion level among a plurality of distance measurement subsections of the next distance measurement section. Accordingly, it is possible to prevent and/or reduce collision between external electronic devices that may occur in the distance measurement sub-section having a high level of congestion.

In FIGS. 8 and 9 according to various embodiments, it has been described that the CP utilization rates 810 and 910 are calculated based on the length of the CP and the number of at least one response message received from at least one external electronic device in the CP section, but the present disclosure is not limited thereto. Thresholds used to calculate the CP utilization rates 810 and 910 may be changed.

FIG. 10 is a diagram 1000 illustrating example information related to congestion in a contention phase (CP) section and a usable ranging round index mask, according to various embodiments.

According to various embodiments, as shown in FIG. 9, the electronic device (e.g., the electronic device 201 of FIG. 2) may configure the value (e.g., "0" or "1") of the load balancing bit (e.g., the load balancing bit 720 in FIG. 7) of the poll message to be broadcast in each ranging round of the next ranging block, based on information related to congestion of each subsection (e.g., each ranging round (e.g., 520, 525, 530, 535, 540, 545 in FIG. 5)) of a plurality of distance measurement subsections included in the distance measurement section.

The electronic device 201 may configure a value of an available ranging round index mask (e.g., the available ranging round index mask 740 of FIG. 7) of the poll message, based on the value of the load balancing bit in the poll message (e.g., "0" or "1").

Referring to FIG. 10, it is assumed that a ranging block (e.g., a distance measurement section) includes seven ranging rounds (e.g., ranging round index 1010 0 to 6).

In an embodiment, according to the above-described embodiments of FIGS. 8 and 9, when the value of the load balancing bit 720 is configured to "0" as the information 1015 related to congestion in the section in which the ranging round (e.g., distance measurement subsection) index 1010 is 0 and 6 is identified as the first level (e.g., quiet) (830, 930), the electronic device 201 may configure (1030, 1060) the value of the available ranging round index mask 1020 to "1". When the value of the load balancing bit 720 is configured to "1" as the information 1015 related to congestion is identified as a second level (e.g., normal) (840, 940) and/or a third level (busy) (850, 950) in the section in which the ranging round (e.g., distance measurement subsection) index 1010 is 1, 2, 3, and 4, the electronic device 201 may configure (1035, 1040, 1045, 1050) a default value that is a value of the available ranging round index mask 1020 to "0".

In an embodiment, the electronic device 201 may configure (1055) the value of the available ranging round index mask 1020 of the current ranging round (e.g., the current distance measurement subsection), for example, the ranging round in which the current poll message is broadcast, to "1". For example, when the index 1010 of a ranging round in which a poll message is to be broadcasted (e.g., a distance measurement subsection) is 5, the value of the ranging round index mask 1020 that is available in a section in which the ranging round index 1010 is 5 may be configured to "1" (1055). When the value of the load balancing bit 720 is configured to "1" as the information 1015 related to congestion in the section in which the ranging round index 1010 is 5 is identified as a third level (e.g., busy), the value of the available ranging round index mask 1020 should be configured to "0", but since the section in which the ranging round index 1010 is 5 is the ranging round in which the current poll message is broadcast, the value of the available ranging round index mask 1020 may be configured to "1". When the value of the ranging round index mask 1020 available in the section in which the ranging round index 1010 is 5 is configured to "0", all external electronic devices that transmit a response message in the section in which the ranging round index 1010 is 5 may change the distance measurement sub-section in the next distance measurement section (e.g., the second distance measurement section). In order to prevent and/or reduce this, the electronic device 201 may be in a state where information related to congestion in a section in which the ranging round index 1010 is 5 is congested at a third level (e.g., busy), but in a current ranging round in which a poll message is to be broadcast (e.g., a section in which the current round index 1010 is 5), the value of the available ranging round index mask 1020 may be configured to "1".

In an embodiment, the value of the available ranging round index mask 1020 may refer, for example, to a value for determining whether the degree of congestion in the corresponding CP section is high or low. For example, when the value of the available ranging round index mask 1020 is configured to "1", it may be identified as having a low degree of congestion. At least one external electronic device that transmits a response message in a ranging round with high congestion may consider a ranging round in which the value of the available ranging round index mask 1020 is "1" as a ranging round available in the next ranging block (e.g., the next distance measurement section). When the value of the available ranging round index mask 1020 is configured to "0", it may be identified as having a high degree of congestion. At least one external electronic device that transmits a response message in a ranging round with high congestion may not consider a ranging round in which the value of the available ranging round index mask 1020 is "0" as a ranging round available in the next ranging block (e.g., the next distance measurement section).

The above-described example will be described in association with the fields of the poll message shown in FIG. 7 (e.g., the load balancing bit 720, the current ranging round index 730, and the available ranging round index mask 740). For example, when a poll message is broadcast in the sixth ranging round of the second ranging block, the value of the load balancing bit 720 of the poll message in the sixth ranging round may be configured to "1", the current ranging round index 730 may be configured to "5", and the available ranging round index mask 740 may be configured to "0x61 (01100001)". In an embodiment, since the usable ranging round index mask 740 is a byte unit, when a bit remains, it may be padded with 0.

In an embodiment, the electronic device 201 may broadcast a poll message in which the value of the load balancing bit 720 is configured to "1", the current ranging round index 730 is configured to "5", and the available ranging round index mask 740 is configured to "0x61 (01100001)" in the sixth ranging round.

In an embodiment, at least one external electronic device receiving the poll message may identify congestion related information of the current ranging round index 730, based on the value of the load balancing bit 720. At least one external electronic device receiving the poll message may maintain or change the ranging round in the next ranging block, based on the information related to congestion, for example, the value of the load balancing bit 720.

For example, at least one external electronic device may identify the value of the load balancing bit 720 of the poll message broadcast from the electronic device 201 in the sixth ranging round of the second ranging block, and as a result of the identification, when the value of the load balancing bit 720 is "1", the electronic device may identify the value of the available ranging round index mask 740. The at least one external electronic device may determine one ranging round among ranging rounds (e.g., sections in which the ranging round index 730 is 0, 5, and 6) in which the value of the available ranging round index mask 740 is configured to "1" as a ranging round in which ranging is performed in the third ranging block. The ranging round in which the value of the available ranging round index mask 740 is configured to "1" is a section in which the ranging round index 730 is 0, 5, and 6, and as the ranging round includes a section in which the current ranging is performed (e.g., a sixth ranging round (e.g., a section in which the ranging round index is 5)), at least one external electronic device may maintain the sixth ranging round as a ranging round in which ranging is performed in the third ranging block, or may change to another ranging round (e.g., the first ranging round or the seventh ranging round).

According to an embodiment, it is assumed that a ranging interval (e.g., a distance measurement period) is 350 ms and a period in which the ranging round index 730 is 6 is selected by an external electronic device, the next ranging of the external electronic device may be performed after 400 ms. For example, since the ranging interval is 350 ms and the number of polls is 7 (e.g., ranging round index 730 0 to 6), each ranging round duration (RR duration) may be 50 ms. As the ranging section is changed from ranging rounds 5 to 6, the next ranging of the external electronic device may be "(ranging interval+(ranging round duration*1))=400 ms".

As another example, when a poll message is broadcast in the first ranging round of the second ranging block, the value of the load balancing bit 720 of the poll message in the first ranging round may be configured to "0" and the current ranging round index 730 may be configured to "0". As the value of the load balancing bit 720 is "0", the available ranging round index mask 740 may be omitted. The electronic device 201 may broadcast a poll message in which the value of the load balancing bit 720 is configured to "0" and the current ranging round index 730 is configured to "0" in the first ranging round. At least one external electronic device may identify the value of the load balancing bit 720 of the poll message broadcast from the electronic device 201 in the first ranging round of the second ranging block, and may maintain a ranging round in which ranging is performed in the third ranging block as the first ranging round when the value of the load balancing bit 720 is "0" as a result of identification.

FIG. 11 is a diagram 1100 illustrating example information related to congestion in a CP period and a ranging round mask available according to various embodiments.

Referring to FIG. 11, it is assumed that a ranging block (e.g., a distance measurement section) includes six ranging rounds (e.g., ranging round index 1110 0 to 5).

In an embodiment, when the value of the load balancing bit (e.g., the load balancing bit 720 in FIG. 7) is configured to "0" as the information related to congestion 1115 is identified as a first level (e.g., quiet) 830, 930 in the section where the ranging round (e.g., distance measurement subsection) index 1110 is 0, 1, 3, and 4 according to the above-described embodiments of FIGS. 8 and 9, the electronic device 201 may configure the value of the available ranging round index mask 1120 to "1" (1130, 1140, 1160, 1170). When the value of the load balancing bit 720 is configured to "1" as the information 1115 related to congestion is identified as the second level (e.g., normal) 840 and 940 in the section in which the ranging round (e.g., distance measurement subsection) index 1110 is 2, the electronic device 201 may configure the value of the available ranging round index mask 1120 to "0", which is a default value (1150).

In an embodiment, the electronic device 201 may configure (1080) the value of the available ranging round index mask 1120 of the current ranging round (e.g., the current distance measurement subsection), for example, the ranging round in which the current poll message is broadcast, to "1". For example, when the index 1110 of a ranging round (e.g., distance measurement subsection) in which the poll message is to be broadcast is 5, the value of the ranging round index mask 1120 that is available in a section in which the ranging round index 1110 is 5 may be configured to "1" (1080).

The above-described embodiment will be described in relation to the fields of the poll message shown in FIG. 7 (e.g., the load balancing bit 720, the current ranging round index 730, and the available ranging round index mask 740). For example, when a poll message including the information related to congestion is broadcast in a sixth ranging round of the second ranging block (e.g., a ranging round in which a current poll message is broadcast), the load balancing bit 720 of the poll message may be configured to "1", the current ranging round index 730 may be configured to "5", and the available ranging round index mask 740 may be configured to "0x3B (00111011b)".

In an embodiment, the electronic device 201 may broadcast a poll message in which the value of the load balancing bit 720 is configured to "1", the current ranging round index 730 is configured to "5", and the available ranging round index mask 740 is configured to "0x3B (00111011b)" in the sixth ranging round of the second ranging block.

In an embodiment, the at least one external electronic device may identify the value of the load balancing bit 720 of the poll message broadcast from the electronic device 201 in the sixth ranging round of the second ranging block, and may identify the value of the available ranging round index mask 740 when the value of the load balancing bit 720 is "1" as a result of the identification. The at least one external electronic device may determine any one ranging round among ranging rounds (e.g., sections in which the ranging round index 730 is 0, 1, 3, 4, and 5) in which the value of the available ranging round index mask 740 is configured to "1" as a ranging round in which ranging is performed in the third ranging block. The ranging round in which the value of the available ranging round index mask 740 is configured to "1" is a section in which the ranging round index 730 is 0, 1, 3, 4, and 5, and the at least one external electronic device may maintain the sixth ranging round as a ranging round in which ranging is performed in the third ranging block, or may change to another ranging round (e.g., the first ranging round, the second ranging round, the fourth ranging round, or the fifth ranging round), as the current ranging section (e.g., the sixth ranging round (e.g., the section in which the ranging round index is 5)) is included.

Figure 12A:
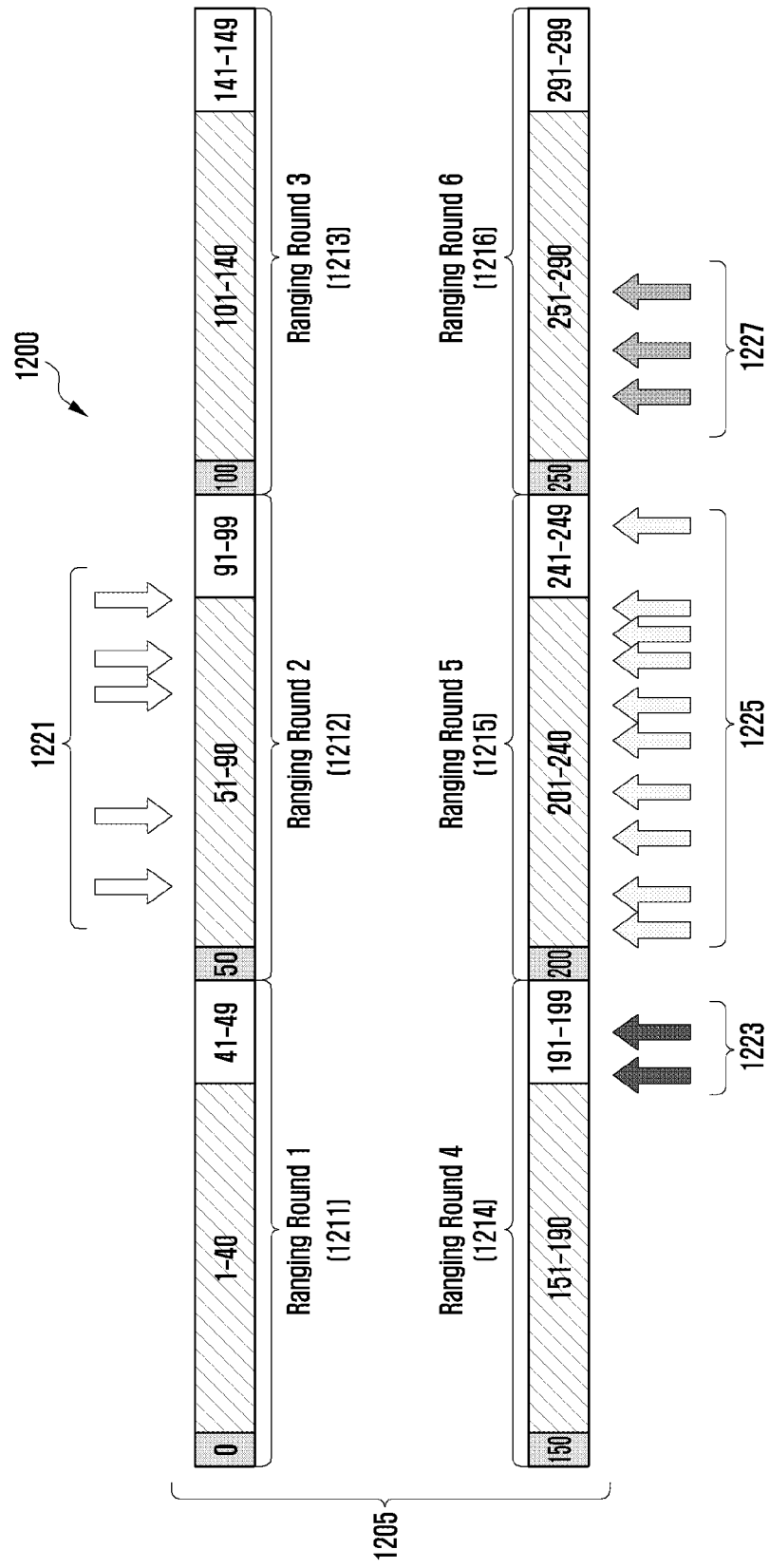
FIGS. 12A, 12B and 12C are diagrams illustrating examples of changing a distance measurement subsection of at least one external electronic device, according to various embodiments.
Figure 12B:
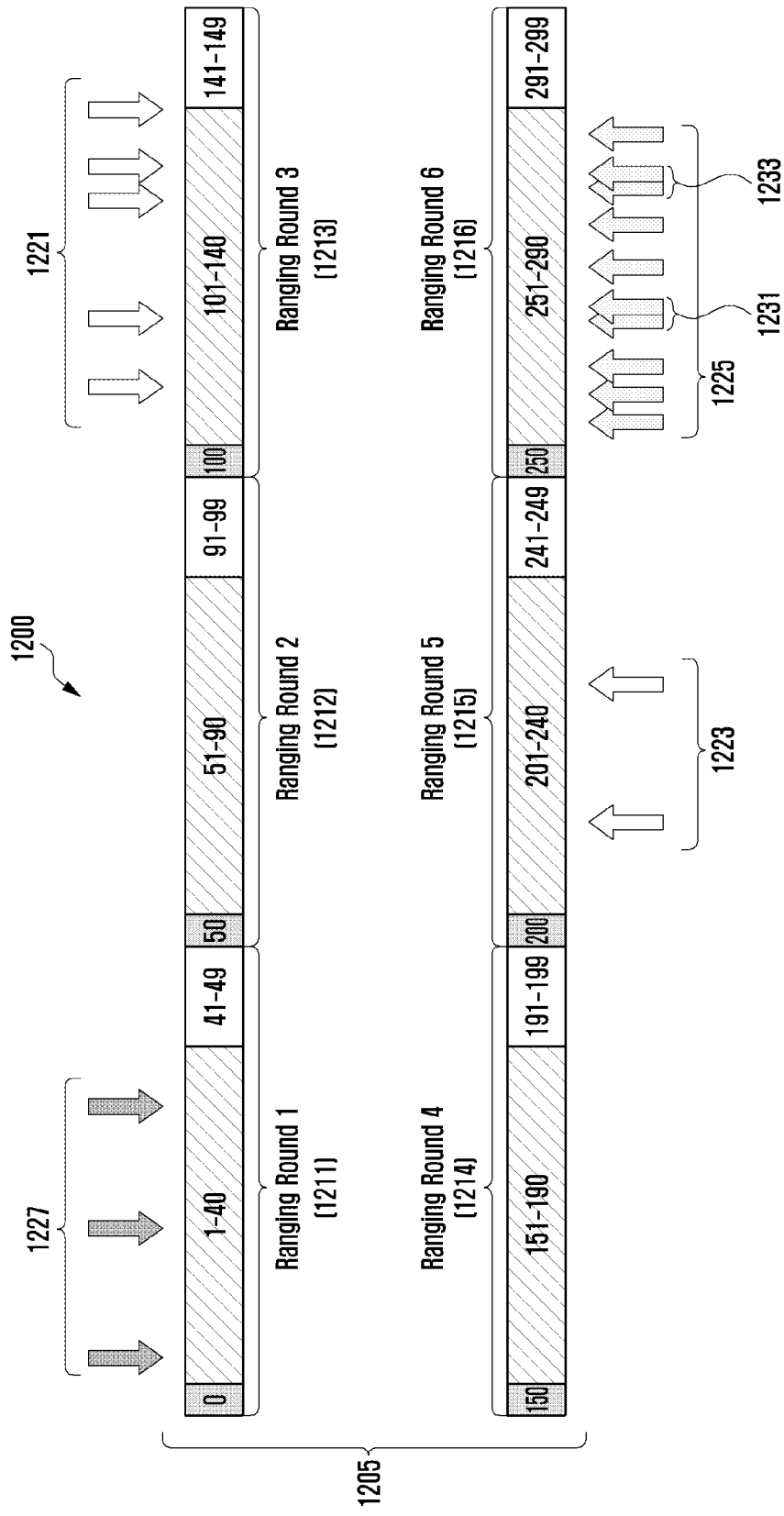
Figure 12C:
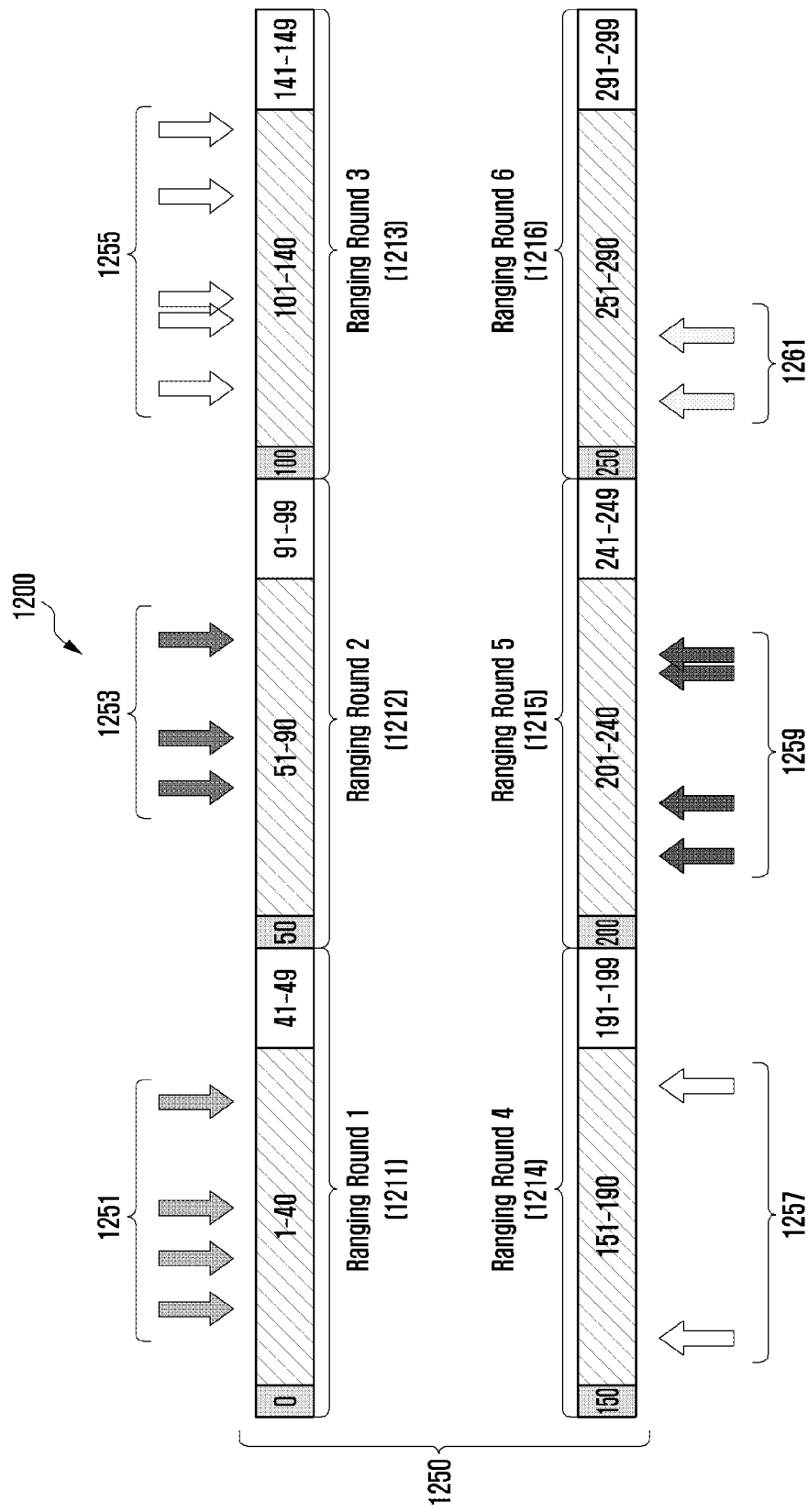

FIGS. 12A, 12B and 12C are diagrams 1200 illustrating an example of changing a distance measurement subsection of at least one external electronic device, according to various embodiments.

Referring to FIGS. 12A and 12B, a ranging block (e.g., a distance measurement period) may include a plurality of ranging rounds (e.g., a plurality of distance measurement subsections), for example, a first ranging round (ranging round1) 1211, a second ranging round (ranging round2) 1212, a third ranging round (ranging round3) 1213, a fourth ranging round (ranging round4) 1214, a fifth ranging round (ranging round5) 1215, and a sixth ranging round (ranging round6) 1216.

In an embodiment, the timing of starting ranging (e.g., measuring distance using UWB) according to the BLE scan period may be different for each external electronic device. Accordingly, the ranging round, in which each external electronic device transmits a response message to the electronic device 201 in response to the first poll message that is broadcast from the electronic device 201, may also be different.

For example, the first external electronic devices 1221 may start ranging in the second ranging round 1212 of the first ranging block 1205, and accordingly, the first external electronic devices 1221 may activate RX of the communication module and wait for the first poll message broadcast from the electronic device 201. As shown in FIG. 12B, when the first external electronic devices 1221 receive the first poll message that is broadcast from the electronic device 201 in slot 100 of the third ranging round 1213 by activating the RX of the communication module, the first external electronic devices 1221 that have started ranging in the second ranging round 1212 may transmit a response message to the electronic device 201 in any one of slots 101 to 140, and then enter the sleep state until slot 100 of the next ranging block (e.g., the second ranging block).

As another example, the second external electronic devices 1223 may start ranging in the fourth ranging round 1214 of the first ranging block 1205, and accordingly, the second external electronic devices 1223 may activate RX of the communication module and wait for the first poll message broadcast from the electronic device 201. As shown in FIG. 12B, when the first poll message that is broadcast from the electronic device 201 is received in slot 200 of the fifth ranging round 1215 by activating the RX of the communication module, the second external electronic devices 1223 that have started ranging in the fourth ranging round 1214 transmit a response message to the electronic device 201 in any one of slots 201 to 240, and then enter the sleep state until slot 200 of the next ranging block (e.g., the second ranging block).

As another example, the third external electronic devices 1225 may start ranging in the fifth ranging round 1215 of the first ranging block 1205, and accordingly, the third external electronic devices 1225 may activate RX of the communication module and wait for the first poll message broadcast from the electronic device 201. As shown in FIG. 12B, when receiving the first poll message broadcast from the electronic device 201 in slot 250 of the sixth ranging round 1216 by activating the RX of the communication module, the third external electronic devices 1225 that have started ranging in the fifth ranging round 1215 may transmit a response message to the electronic device 201 in any one of slots 251 to 290, and then enter the sleep state until slot 250 of the next ranging block (e.g., the second ranging block).

As another example, the fourth external electronic devices 1227 may start ranging in the sixth ranging round 1216 of the first ranging block, and accordingly, the fourth external electronic devices 1227 may activate RX of the communication module and wait for the first poll message broadcast from the electronic device 201. As shown in FIG. 12B, when receiving the first poll message broadcast from the electronic device 201 in slot 0 of the first ranging round 1211 by activating the RX of the communication module, the fourth external electronic devices 1227 that started ranging in the sixth ranging round 1216 may transmit a response message to the electronic device 201 in any one of slots 1 to 40, and then enter the sleep state until slot 0 of the next ranging block (e.g., the second ranging block).

Since the ranging start time is different according to various embodiments, the electronic device 201 may receive a plurality of response messages from a plurality of external electronic devices in a specific ranging round. For example, in the first ranging block 1205, for example, 20 external electronic devices 1221, 1223, 1225, 1227 may perform ranging, and since 10 third external electronic devices 1225 randomly transmit response messages in 40 slots (e.g., 215 to 290) in a sixth ranging round 1216 among a plurality of ranging rounds of the first ranging block 1205, collisions (e.g., 1231 and 1233) may occur in a probabilistic manner. Accordingly, some of the plurality of external electronic devices may fail ranging. In contrast, there may not be a response message received from at least one external electronic device in the second ranging round 1212 and the fourth ranging round 1214.

In an embodiment, the electronic device 201 may determine the utilization rate of each ranging round, based on each ranging round of the plurality of ranging rounds according to FIG. 12B and the number of at least one response message received from the at least one external electronic device in each ranging round. The electronic device 201 may determine whether the utilization rate of each ranging round is within a specified range, and may determine information related to congestion of each ranging round, based on this.

In an embodiment, in the second ranging block, the electronic device 201 may broadcast the second poll message including a load balancing bit (e.g., a load balancing bit 720 of FIG. 7) configured based on information related to congestion in each of the plurality of ranging rounds, a current ranging round index (e.g., the current ranging round index 730 of FIG. 7), and an available ranging round index mask (e.g., the available ranging round index mask 740 in FIG. 7).

In an embodiment, after broadcasting the second poll message in each of the plurality of ranging rounds of the second ranging block, the electronic device 201 may update the information related to congestion in each ranging round. For example, when broadcasting a poll message at the start of a ranging round, the electronic device 201 may transmit a poll message including updated information related to congestion. For example, when the current ranging round (e.g., the second ranging round) is 5 (e.g., the last ranging round), the electronic device 201 may configure the load balancing bit 720 and the available ranging round index mask 740, based on the information related to congestion from ranging round 5 of the previous ranging block (e.g., the first ranging block) stored in the memory to ranging round 4 of the current ranging block (e.g., the second ranging block). In the current ranging round 5, the electronic device 201 may configure the load balancing bit to "1" when the ranging round 5 of the previous ranging block (e.g., the first ranging block) is "busy", and may configure an available ranging round index mask 740 and broadcast a poll message including the ranging round index mask 740, based on the updated information related to congestion from ranging rounds 0 to 4 of the current ranging block (e.g., the second ranging block) and information related to congestion of ranging round 5 of the previous ranging block (e.g., the first ranging block).

In an embodiment, at least one external electronic device receiving the broadcast second poll message may transmit a response message to the electronic device 201 in response to the second poll message, and may determine a ranging round in which to transmit the response message in the third ranging block.

According to various embodiments, it is assumed that it is the time to broadcast the second poll message in the sixth ranging round 1216 of the current second ranging block (not shown) and information related to congestion of the sixth ranging round 1216 in the previous ranging block (e.g., the first ranging block 1205) is at a third level (e.g., busy) (e.g., the third level 850 of FIG. 8, the third level 950 of FIG. 9) (or the fourth level (e.g., overcrowded) (e.g., the fourth level 960 of FIG. 9)).

In an embodiment, the electronic device 201 may configure the load balancing bit 720 of the second poll message to "1", configure the current ranging round index 730 to "5", and configure the available ranging round index mask 740 to "111110", based on the identification of information related to congestion of the sixth ranging round 1216 in which the current second poll message is to be broadcast is identified as a third level (e.g., busy).

In an embodiment, the available ranging round index mask 740 may be configured based on information related to congestion of the first to fifth ranging rounds 1211, 1212, 1213, 1214, and 1215 of the second ranging block (not shown), and information related to congestion of the sixth ranging round 1215 of the first ranging block 1205, at the time of broadcasting the second poll message in the sixth ranging round 1216.

For example, the information related to congestion in the first to fifth ranging rounds 1211, 1212, 1213, 1214, and 1215 of the second ranging block (not shown) may include the updated information related to congestion. When each ranging round of the second ranging block (not shown) ends, the electronic device 201 may update the information related to congestion in each ranging round (e.g., update information related to congestion in each ranging round of the first ranging block to information related to congestion determined in each ranging round of the second ranging block). The electronic device 201 may store the updated information related to congestion of each ranging round. The electronic device 201 may configure an available ranging round index mask 930, based on the updated information related to congestion of the first to fifth ranging rounds 1211, 1212, 1213, 1214, 1215, and the information related to the congestion of the sixth ranging round 1215 of the first ranging block 1205, at the time of broadcasting the second poll message in the sixth ranging round 1216.

In an embodiment, the electronic device 201 may broadcast the second poll message including the information related to congestion in which the value of the load balancing bit 720 is configured to "1", the current ranging round index 730 is configured to "5", and the available ranging round index mask 740 is configured to "00111110" in the slot 250 of the sixth ranging round 1216 of the second ranging block (not shown).

In an embodiment, the third external electronic devices 1225 may receive the second poll message including information related to congestion of the sixth ranging round 1216 broadcast in the sixth ranging round 1216 of the second ranging block (not shown). The third external electronic devices 1225 may identify the value of the load balancing bit 720 included in the second poll message. As a result of the identification, when the value of the load balancing bit 720 is "1", the third external electronic devices 1225 may identify the value of the available ranging round index mask 740 included in the second poll message. At least one external electronic device of the third external electronic devices 1225 may determine one ranging round among at least one ranging round in which the value of the available ranging round index mask 740 is configured to "1" as a ranging round in which ranging is to be performed.

For example, referring to FIG. 12C, at least one third external electronic device (1225) performing ranging in the sixth ranging round 1216 of the first ranging block 1205 and the second ranging block (not shown) may determine any one ranging round among at least one ranging round in which the value of the available ranging round index mask 740 is configured to "1" (e.g., the first ranging round 1211, the second ranging round 1212, and the third ranging round) 1213, the fourth ranging round 1214, and the fifth ranging round 1215) as a ranging round in which ranging is performed in the third ranging block 1250 (e.g., change from sixth ranging round 1216 to another ranging round (one of 1211, 1212, 1213, 1214, 1215)). Alternatively, at least one fourth external electronic device 1217 that has performed ranging in the sixth ranging round 1216 of the first ranging block 1205 and the second ranging block (not shown) may maintain the third ranging block 1250 to also perform ranging in the sixth ranging round 1216.

According to the above-described embodiments, as the value of the load balancing bit 720 included in the poll message is identified, the ranging round in which the ranging is performed in the third ranging block 1250 can be maintained or changed, based on the value of the available ranging round index mask 740, when the value of the load balancing bit 720 is configured to "1", the plurality of electronic devices 1251, 1253, 1255, 1257, 1259, and 1261 may be dispersed in each of the ranging rounds of the ranging block to perform ranging. For example, the first external electronic devices 1251 may start ranging in the first ranging round 1211 of the first ranging block, the second external electronic devices 1253 may start ranging in the second ranging round 1212, the third external electronic devices 1255 may start ranging in the third ranging round 1213, the fourth external electronic devices 1257 may start ranging in the fourth ranging round 1214, the fifth external electronic devices 1259 may start ranging in the fifth ranging round 1215, and the sixth external electronic devices 1261 may start ranging in the sixth ranging round 1216.

Figure 13:
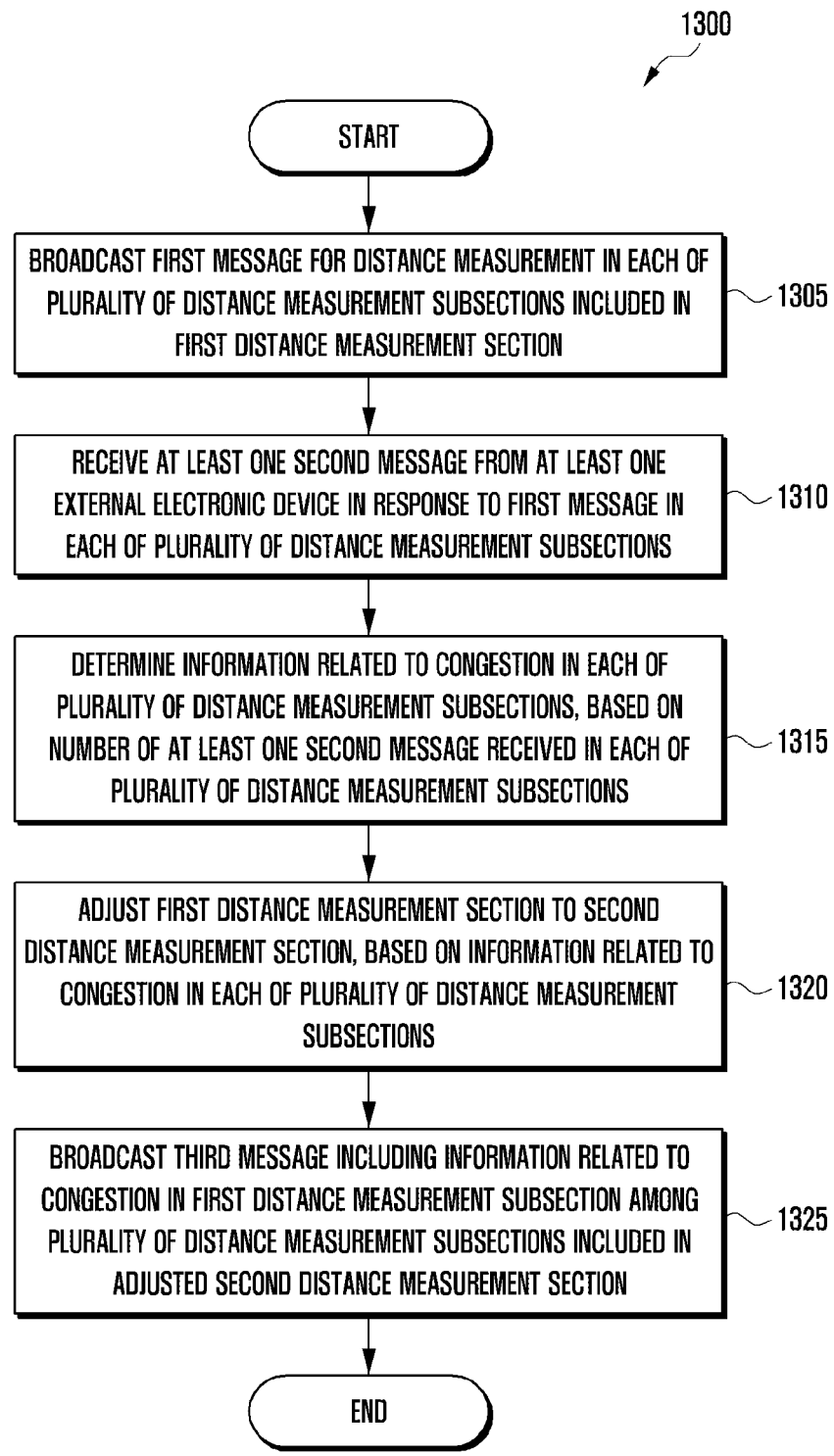
FIG. 13 is a flowchart illustrating an example method of operating an electronic device for broadcasting a message for measuring a distance, according to various embodiments.

FIG. 13 is a flowchart 1300 illustrating an example method of operating an electronic device for broadcasting a message for measuring a distance, according to various embodiments.

Since operations 1305, 1310 and 1315 of FIG. 13 according to various embodiments are the same as operations 305, 310 and 315 of FIG. 3A described above, a detailed description thereof may be replaced with a description related to FIG. 3A.

Referring to FIG. 13, in operation 1305, the electronic device (e.g., the electronic device 201 of FIG. 2) may broadcast a first message for distance measurement in each of a plurality of distance measurement subsections included in the first distance measurement section. In operation 1310, the electronic device 201 may receive at least one second message from at least one external electronic device in response to the first message in each of the plurality of distance measurement subsections. In operation 1315, the electronic device 201 may determine information related to congestion in each of the plurality of distance measurement subsections, based on the number of at least one second message received in each of the plurality of distance measurement subsections.

In an embodiment, in operation 1320, the electronic device 201 may adjust the first distance measurement section to the second distance measurement section, based on the information related to congestion in each of the plurality of distance measurement subsections.

In an embodiment, the distance measurement section (e.g., ranging interval) may be defined in advance. When a plurality of external electronic devices transmit a response message in a specific distance measurement subsection among a plurality of distance measurement subsections included in the distance measurement section, the electronic device 201 may temporarily adjust the distance measurement section, for example, increase the distance measurement section.

In an embodiment, in operation 1325, the electronic device 201 may broadcast a third message including information related to congestion in the first distance measurement subsection among the plurality of distance measurement subsections included in the adjusted second distance measurement section.

In connection with the above-described operations 1320 and 1325, various embodiments will be described in greater detail below with reference to FIG. 14A.

Although it has been described in FIG. 13 that the first distance measurement section is adjusted to the second distance measurement section, based on the information related to congestion in each of the plurality of distance measurement subsections, the present disclosure is not limited thereto. The electronic device 201 may adjust the second section (e.g., a CP section) of each of the distance measurement subsections, based on the information related to congestion in each of the plurality of distance measurement subsections. With respect to the configuration for adjusting the second section of each distance measurement subsection, various embodiments will be described with reference to FIG. 14B to be described later.

Figure 14A:
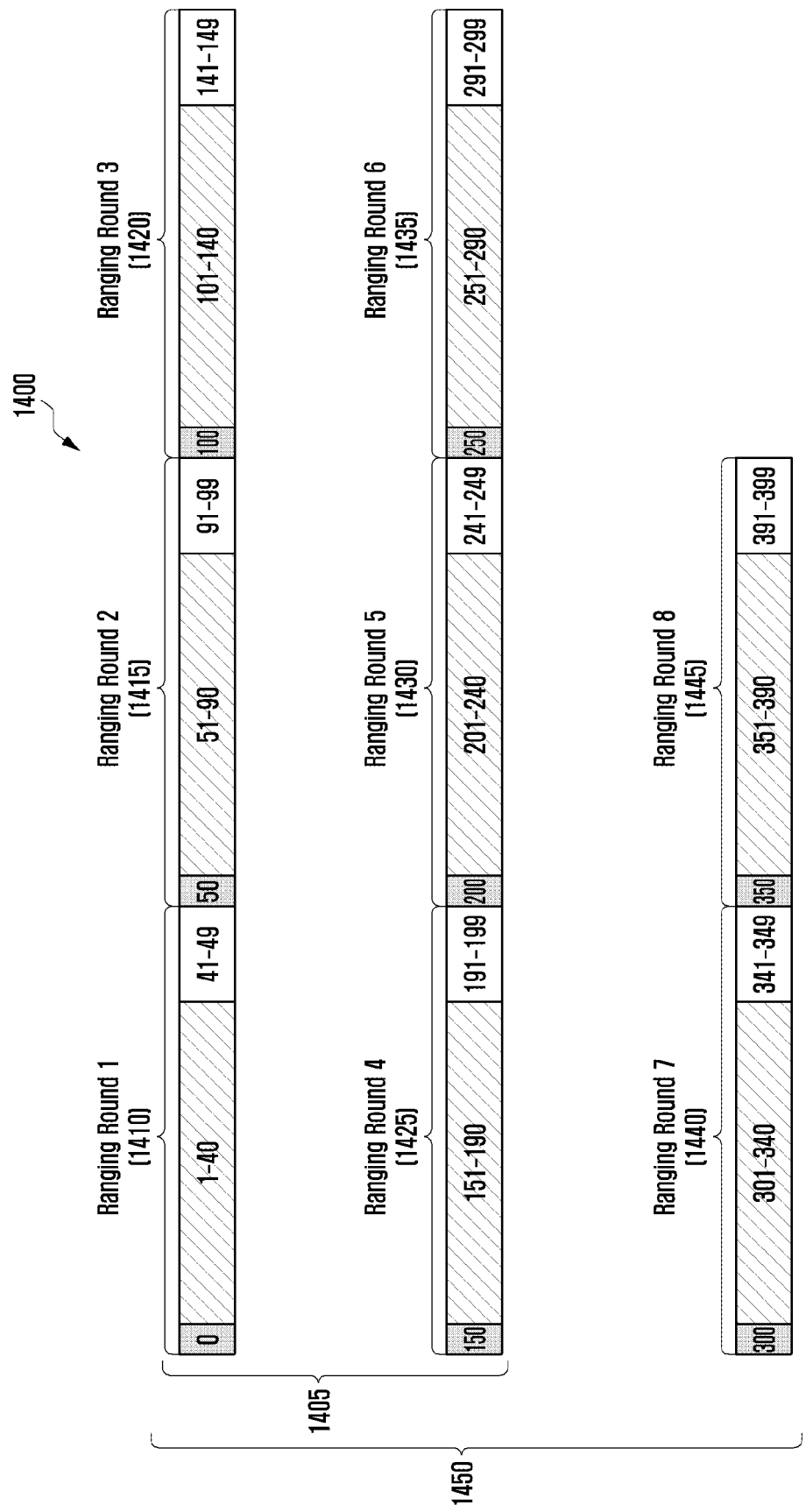
FIG. 14A is a diagram illustrating an example of adjusting a distance measurement section according to various embodiments.

FIG. 14A is a diagram 1400 illustrating an example of adjusting a distance measurement section according to various embodiments.

Referring to FIG. 14A, a first ranging block 1405 may include six ranging rounds, for example, a first ranging round (ranging round1) 1410, a second ranging round (ranging round2) 1415, a third ranging round (ranging round3) 1420, a fourth ranging round (ranging round4) 1425, a fifth ranging round (ranging round5) 1430, and a sixth ranging round (ranging round6) 1435.

In an embodiment, an electronic device 201 may broadcast a first message (e.g., a poll message) for distance measuring in each of a plurality of ranging rounds of the first ranging block 1405. At least one external electronic device that has received the first message may transmit a second message (e.g., a response message) to the electronic device 201 in response to the first message in a specific section (e.g., CP section).

According to various embodiments, in each of the plurality of ranging rounds included in the first ranging block 1405, the plurality of external electronic devices may randomly transmit a response message. The electronic device 201 may determine information related to congestion in each ranging round, based on the number of response messages received in each ranging round. When the information related to congestion in each ranging round is identified as being at a third level (e.g., busy) (e.g., third level 850 in FIG. 8, third level 950 in FIG. 9) or a fourth level (e.g., overcrowded) (e.g., fourth level 960 in FIG. 9), the electronic device 201 may add a seventh ranging round (ranging round7) 1440 and an eighth ranging (ranging round8) round 1445 to the first ranging block 1405 (e.g., a distance measurement section) to increase the first ranging block 1405 (e.g., a distance measurement section) from 300 ms to 400 ms (1450).

In an embodiment, as the first ranging block 1405 increases, the value of the ranging round (e.g., the ranging round 710 in FIG. 7) of the poll message broadcast in the next ranging block may be changed from "6" to "8".

In an embodiment, when increasing the first ranging block 1405 (e.g., a distance measurement section), the electronic device 201 may configure the load balancing bit (e.g., load balancing bit 720 in FIG. 7) of the third message (e.g., a poll message) to be broadcast in ranging rounds (e.g., information related to congestion is third level and/or fourth level ranging rounds) with high congestion to "1", and may configure the ranging round (e.g., the seventh ranging round 1440) that is newly added to an available ranging round index mask (e.g., an available ranging round index mask 740 of FIG. 7) and the available range round index mask 740 for the eighth ranging round 1445 to "1".

In an embodiment, the electronic device 201 may broadcast a third message (e.g., a poll message) including a load balancing bit (e.g., the load balancing bit 720 in FIG. 7) configured as the first ranging block 1405 (e.g., distance measurement section) is increased from 300 ms to 400 ms (1450), a current ranging round index (e.g., the current ranging round index 730 of FIG. 7), and an available ranging round index mask (e.g., available ranging round index mask 740 in FIG. 7) in each ranging round of the next ranging block (not shown).

In an embodiment, the at least one external electronic device that has received the third message (e.g., a poll message) in each ranging round of the second ranging block (not shown) may identify the information related to congestion of the current ranging round index 730, based on the value of the load balancing bit 720 included in the third message. When the information related to congestion, for example, the value of the load balancing bit 720 is configured to "1", at least one external electronic device receiving the third message may identify the value of the available ranging round index mask 740, and based on this, may maintain or change the ranging round in which ranging is performed in a next ranging block (e.g., a third ranging block).

In an embodiment, the electronic device 201 may determine information related to congestion in each ranging round, based on the number of response messages received in each ranging round of the ranging rounds of the second ranging block (not shown). When the information related to congestion in each ranging round is identified as being at the first level (e.g., quiet) (e.g., first level 830 in FIG. 8, first level 930 in FIG. 9) or second level (e.g., normal) (e.g., second level 840 in FIG. 8); second level 940 of FIG. 9), the electronic device 201 may reduce the ranging block from 400 ms (1450) to the existing 300 ms (1405) by excluding the seventh ranging round (ranging round7) 1440 and the eighth ranging round (ranging round8) 1445.

In an embodiment, as the first ranging block decreases, the value of the ranging round (e.g., the ranging round 710 in FIG. 7) of the poll message broadcast in the next ranging block is "8" to "6"" may be changed.

In an embodiment, when reducing the ranging block from 400 ms to 300 ms, the electronic device 201 may configure the load balancing bit 720 for the seventh ranging round 1440 and the eighth ranging round 1445 of the poll message to be broadcast in each ranging round of the next ranging block to "0", and may configure the available range round index mask 740 of the seventh ranging round 1440 and the eighth ranging round 1445 to "0".

In an embodiment, the electronic device 201 may broadcast a fourth message (a poll message) including the load balancing bit 720, the current ranging round index 730, and the available ranging round index mask 740, which are configured by reducing the ranging block from 400 ms to 300 ms.

In an embodiment, the at least one external electronic device receiving the fourth message may identify the information related to congestion of the current ranging round index 730, based on the value of the load balancing bit 720 included in the fourth message. When the information related to congestion, for example, the value of the load balancing bit 720 is configured to "1", the at least one external electronic device receiving the fourth message may maintain or change a ranging round in which ranging is performed in a next ranging block (e.g., a fourth ranging block), based on the value of the available ranging round index mask 740.

In FIG. 14A according to various embodiments of the present disclosure, as the distance measurement section can be increased or decreased based on the number of response messages in the specific distance measurement subsection, collisions between a plurality of external electronic devices can be reduced and the distance measurement success rate can also be increased.

Figure 14B:
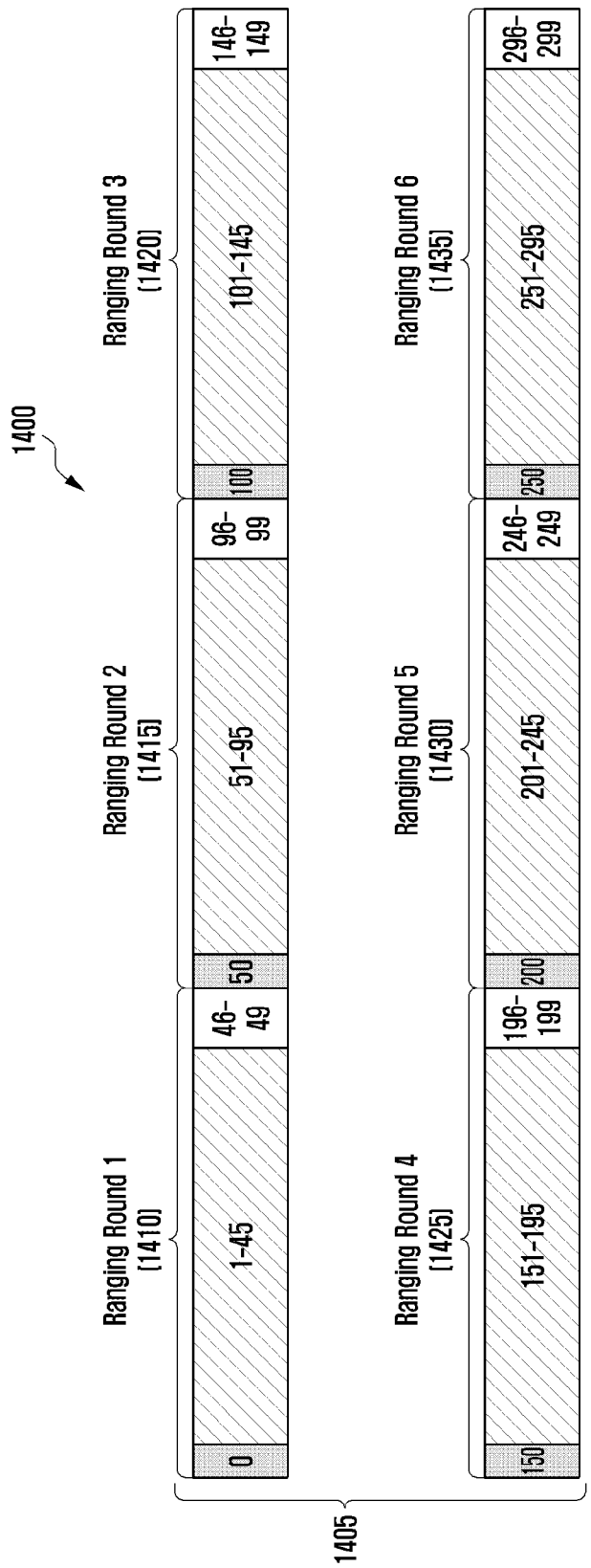
FIG. 14B is a diagram illustrating an example of adjusting a CP section, according to various embodiments.

FIG. 14B is a diagram 1460 illustrating an example of adjusting a CP section, according to various embodiments.

Referring to FIG. 14B, a first ranging block 1405 may include a first ranging round (ranging round1) 1410, a second ranging round (ranging round2) 1415, a third ranging round (ranging round3) 1420, a fourth ranging round (ranging round4) 1425, a fifth ranging round (ranging round5) 1430, and a sixth ranging round (ranging round6) 1435.

In an embodiment, an electronic device 201 may broadcast a first message (e.g., a poll message) for distance measuring at each of a plurality of ranging rounds of the first ranging block 1405. At least one external electronic device receiving the first message responds to the first message in a specific section (e.g., CP section (e.g., 522, 527, 532, 537, 542, 547 in FIG. 5)) to transmit a second message (e.g., a response message) to the electronic device 201.

According to various embodiments, in each of the plurality of ranging rounds included in the first ranging block 1405, the plurality of external electronic devices may randomly transmit a response message. The electronic device 201 may determine information related to congestion in each ranging round based on the number of response messages received in each ranging round. When the information related to congestion in each ranging round is identified as being at a third level (e.g., busy) (e.g., a third level 850 in FIG. 8, a third level 950 in FIG. 9) or a fourth level (e.g., overcrowded) (e.g., fourth level 960 in FIG. 9), the electronic device 201 may adjust the second section (e.g., 522, 527, 532, 537, 542, 547) of each ranging round, for example, a CP section. For example, when the CP section is configured to "40 ms", the electronic device 201 may change it to "45 ms". As the CP section is changed, the third period (e.g., idle section) of each ranging round (e.g., 523, 528, 533, 538, 543, 548 of FIG. 5) may also be adjusted.

In an embodiment, as the CP section of each ranging round is changed, the contention phase of the poll message broadcast in the next ranging block (e.g., the contention phase 620 in FIG. 6) may be changed from "40 ms" to "45 ms".

In an embodiment, the electronic device 201 may determine information related to congestion in each ranging round, based on the number of response messages received in each ranging round of the ranging rounds of the second ranging block (not shown). When the information related to congestion in each ranging round is identified as being at a first level (e.g., quiet) (e.g., first level 830 in FIG. 8, first level 930 in FIG. 9) or at a second level (e.g., normal) (e.g., the second level 840 of FIG. 8, the second level 940 of FIG. 9), the electronic device 201 may adjust the CP section. For example, the electronic device 201 may change the changed CP section "45 ms" to a predetermined value, for example, "40 ms". As the CP section is changed, the third section (e.g., idle section) of each ranging round may also be adjusted.

In an embodiment, as the CP section of each ranging round is changed, the contention phase 620 of the poll message broadcast in the next ranging block may be changed from "45 ms" to "40 ms".

In FIG. 14B according to various embodiments, as the time of the contention phase can be configured longer than the specified time or the long configuration time can be reduced to the specified time, based on the number of response messages in a specific distance measurement subsection, a collision between a plurality of external electronic devices may be prevented and/or reduced, and a distance measurement success rate may be increased.

The scenarios illustrated and described with reference to FIGS. 3 to 14B according to various embodiments may be applied to a contactless secure access service. For example, an electronic device (e.g., a non-contact access control system) recognizes electronic devices (e.g., external electronic devices) provided by users through a communication module (e.g., UWB communication module) even if the user does not take a picture of the pass. When a plurality of users approach an entrance in a specific distance measurement subsection, the electronic device (e.g., a non-contact access control system) may not recognize all of the plurality of electronic devices (e.g., a plurality of external electronic devices). According to the above-described various embodiments of the present disclosure, the electronic device (e.g., a contactless access control system) may broadcast a message for distance measurement (e.g., a poll message) including information related to congestion to a plurality of electronic devices (e.g., a plurality of external electronic devices) so that the plurality of electronic devices (e.g., a plurality of external electronic devices) that transmit a response message in a distance measurement subsection having a high degree of congestion among distance measurement subsections can transmit a response message in another distance measurement subsection. Accordingly, collisions between a plurality of electronic devices (e.g., a plurality of external electronic devices) that may occur in a specific distance measurement subsection may be prevented and/or reduced. In addition, the electronic device (e.g., a non-contact access control system) may accurately measure a distance (or angle) from a plurality of electronic devices (e.g., a plurality of external electronic devices).

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), the element may be coupled with the other element directly (e.g., through wires), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a communication module; and
   a processor operatively coupled to the communication module,
   wherein the processor is configured to:
   broadcast, via the communication module, a first message for measuring a distance in each of a plurality of distance measurement subsections included in a first distance measurement section;
   receive, via the communication module, in each of the distance measurement subsections, at least one second message in response to the first message from at least one external electronic device;
   determine, based on the number of the at least one second message received in each of the plurality of distance measurement subsections, information related to congestion of each of the plurality of distance measurement subsections; and
   broadcast, through the communication module, a third message comprising the information related to the congestion in a first distance measurement subsection of a plurality of distance measurement subsections included in a second distance measurement section.

2. The electronic device of claim 1, wherein the first distance measurement section comprises a period for measuring the distance and/or direction of the at least one external electronic device, and
wherein each of the plurality of distance measurement subsections comprises a section in which the first message is broadcast, and distance measurement is completed with at least a portion of the at least one external electronic device based on the second message received in response to the first message.

3. The electronic device of claim 1, wherein the processor is further configured to:
determine a utilization rate of each of the distance measurement subsections, based on each distance measurement subsection of the plurality of distance measurement subsections and the number of the at least one second messages received in each distance measurement subsection; and
determine the congestion level of each location measurement subsection, based on the utilization rate of each location measurement subsection.

4. The electronic device of claim 3, wherein the processor is further configured to:
analyze the at least one second message to determine whether reception succeeds or fails; and
calculate a number of second messages, based on the number of the successfully received second messages, the number of the second messages that have failed to be received, or the number corresponding to the number of the second messages that have failed to be received.

5. The electronic device of claim 3, wherein the processor is further configured to:
configure a load balancing bit of the third message, based on the congestion level of each distance measurement subsection;
configure a distance measurement subsection index of the third message, based on the current distance measurement subsection in which the third message is to be broadcast; and
configure an available distance measurement subsection index mask for each of the distance measurement subsections, based on the value of the configured load balancing bit.

6. The electronic device of claim 1, wherein the processor is further configured to adjust the second distance measurement section or adjust a section of a contention phase of each of a plurality of distance measurement subsections of the second distance measurement section based on the information related to the congestion for each of the distance measurement subsections of the plurality of distance measurement subsections of the second distance measurement section being included in the designated first range.

7. The electronic device of claim 6, wherein the processor is further configured to add at least one distance measurement subsection to a plurality of distance measurement subsections included in the second distance measurement section and configure a third distance measurement section, based on the plurality of distance measurement subsections and the added at least one distance measurement subsection, based on the congestion related information for each of the distance measurement subsections of the plurality of distance measurement subsections of the second distance measurement section being included in the designated first range.

8. The electronic device of claim 7, wherein the processor is further configured to exclude the added at least one distance measurement subsection, and configure a fourth distance measurement section based on the plurality of distance measurement subsections and the excluded at least one distance measurement subsection, based on the information related to the congestion for each of the distance measurement subsections of the plurality of distance measurement subsections of the third distance measurement section being included in the designated second range, and
wherein a congestion degree of the designated first range is greater than a congestion degree of the designated second range.

9. The electronic device of claim 7, wherein the processor is further configured to configure the contention phase to the specified time to configure a fourth distance measurement section based on the information related to the congestion for each of the distance measurement subsections of the plurality of distance measurement subsections of the third distance measurement section being included in the designated second range, and
wherein the congestion degree of the designated first range is greater than the congestion degree of the designated second range.

10. The electronic device of claim 6, wherein the processor is further configured to configure a contention phase of each of the distance measurement subsections of the plurality of distance measurement subsections longer than a specified time to configure a third distance measurement section, based on the congestion related information for each of the distance measurement subsections of the plurality of distance measurement subsections of the second distance measurement section being included in the designated first range.

11. The electronic device of claim 1, wherein the communication module comprises an ultra-wideband (UWB) communication module.

12. A method of performing communication of an electronic device, the method comprising:
broadcasting, through a communication module, a first message for distance measurement in each distance measurement subsection of a plurality of distance measurement subsections included in the first distance measurement section;
receiving at least one second message in response to the first message from at least one external electronic device in each of the distance measurement subsections of the plurality of distance measurement subsections;
determining, based on the number of the at least one second messages received in the distance measurement subsection of each of the plurality of distance measurement subsections, information related to congestion of each of the plurality distance measurement subsections; and
broadcasting, through the communication module, a third message comprising information related to congestion in a first distance measurement subsection among a plurality of distance measurement subsections included in the second distance measurement section.

13. The method of claim 12, wherein the first distance measurement section comprises a period for measuring the distance or direction of the at least one external electronic device, and
wherein each of the plurality of distance measurement subsections comprises a section in which the first message is broadcast and distance measurement is completed with at least a portion of the at least one external electronic device based on the second message received in response to the first message.

14. The method of claim 12, wherein the determining information related to congestion of each of the plurality distance measurement subsections comprises:
    determining a utilization rate of each of the distance measurement subsections, based on each distance measurement subsection of the plurality of distance measurement subsections and the number of the at least one second messages received in each distance measurement subsection; and
    configuring a congestion level of each of the location measurement subsections to be determined, based on the utilization rate of each of the distance measurement subsections.

15. The method of claim 14, wherein the determining the utilization rate of each of the distance measurement subsections comprises:
    analyzing the at least one second message to determine whether reception succeeds or fails;
    calculating a number of second messages, based on the number of the successfully received second messages, the number of the second messages that have failed to be received, or the number corresponding to the number of the second messages that have failed to be received; and
    determining the utilization rate of each of the distance measurement subsections, based on each distance measurement subsection of the plurality of distance measurement subsections and the number of the at least one second messages received in each distance measurement subsection.

16. The method of claim 12, wherein broadcasting the third message comprising information related to congestion comprises:
    configuring a load balancing bit of the third message, based on the congestion level of each distance measurement subsection;
    configuring a distance measurement subsection index of the third message, based on a current distance measurement subsection in which the third message is to be broadcast; and
    configuring an available distance measurement subsection index mask for each of the distance measurement subsections, based on the value of the configured load balancing bit.

17. The method of claim 12, further comprising:
    adjusting the second distance measurement section or adjusting a section of a contention phase of each of a plurality of distance measurement subsections of the second distance measurement section based on the information related to the congestion for each of the distance measurement subsections of the plurality of distance measurement subsections of the second distance measurement section being included in the designated first range.

18. An electronic device comprising:
    a communication module; and
    a processor operatively coupled to the communication module,
    wherein the processor is configured to:
    receive, via the communication module, a first message for measuring a distance from an external electronic device in a first distance measurement subsection included in a first distance measurement section;
    transmit, via the communication module, a second message in response to the first message to the external electronic device;
    receive, via the communication module, a third message including information related to the congestion from the external electronic device in a first distance measurement subsection included in a second distance measurement section; and
    transmit, via the communication module, a fourth message in response to the third message to the external electronic device, and determine a distance measurement subsection to be transmit a fifth message in a third distance measurement section based on the information related to the congestion.

19. The electronic device of claim 18, wherein the third message comprises at least one of a load balancing bit, an index of a current distance measurement subsection, or an index mask of an available distance measurement subsection in the first distance measurement subsection included in the second distance measurement section.

20. The electronic device of claim 19, wherein the processor is further configured to:
    identify a value of the load balancing bit included in the third message;
    identify, when the value of the load balancing bit is set to a first value, the index mask of the available distance measurement subsection; and
    based on the index mask of the available distance measurement subsection, maintain the distance measurement subsection to be transmit the fifth message in the third distance measurement subsection as the first distance measurement subsection, or change the distance measurement subsection to be transmit the fifth message in the third distance measurement subsection to a distance measurement subsection different from the first distance measurement subsection.

* * * * *